(12) United States Patent
Shum et al.

(10) Patent No.: US 10,058,774 B2
(45) Date of Patent: Aug. 28, 2018

(54) SIGILS FOR USE WITH APPAREL

(71) Applicant: NIKE, Inc., Beaverton, OR (US)

(72) Inventors: Albert Shum, Portland, OR (US); Thomas Foxen, Portland, OR (US); James C. Meschter, Portland, OR (US); Yves Behar, San Francisco, CA (US)

(73) Assignee: NIKE, Inc., Beaverton, OR (US)

(*) Notice: Subject to any disclaimer, the term of this patent is extended or adjusted under 35 U.S.C. 154(b) by 0 days.

(21) Appl. No.: 15/434,192

(22) Filed: Feb. 16, 2017

(65) Prior Publication Data
US 2017/0157508 A1 Jun. 8, 2017

Related U.S. Application Data

(63) Continuation of application No. 14/848,631, filed on Sep. 9, 2015, now Pat. No. 9,597,598, which is a (Continued)

(51) Int. Cl.
*A63F 13/213* (2014.01)
*A63F 13/98* (2014.01)
(Continued)

(52) U.S. Cl.
CPC ............ *A63F 13/213* (2014.09); *A41D 1/002* (2013.01); *A41D 13/0015* (2013.01);
(Continued)

(58) Field of Classification Search
CPC ........ A63F 13/06; A63F 13/80; A63F 13/211; A63F 13/213; A63F 13/98;
(Continued)

(56) References Cited

U.S. PATENT DOCUMENTS 1,963,110 A 6/1934 Assael
3,797,010 A 3/1974 Adler et al.
(Continued)

FOREIGN PATENT DOCUMENTS

DE 3447171 A1 9/1985
EP 0908701 A2 4/1999
(Continued)

OTHER PUBLICATIONS

Aug. 26, 2005—(WO) ISR—PCT App. No. PCT/US2005/012954.
(Continued)

*Primary Examiner* — Jasson Yoo
(74) *Attorney, Agent, or Firm* — Banner & Witcoff, Ltd.

(57) ABSTRACT

Apparel is disclosed that can be worn to assist an interactive game in tracking the movement of the wearer. The apparel may include one or more tracking marks formed of designs, patterns, or reflective materials that can be easily tracked by an interactive game. By providing tracking marks on apparel, rather than using a special-purpose device that must be separately worn, a player may enjoy a more natural feel when playing the interactive game. A user can wear the apparel for everyday purposes, and then simply begin playing the game wearing the apparel without having to put on any additional equipment. The apparel may use reflective materials, and the interactive game can employ a camera and a light source configuration where the camera is located within the observation angle of a player employing retroreflective materials reflecting light from the light source.

20 Claims, 40 Drawing Sheets

Related U.S. Application Data continuation of application No. 12/626,120, filed on Nov. 25, 2009, now Pat. No. 9,162,142, which is a continuation of application No. 10/827,989, filed on Apr. 19, 2004, now abandoned, which is a continuation-in-part of application No. 10/286,396, filed on Oct. 30, 2002, now Pat. No. 8,206,219.

(60) Provisional application No. 60/463,825, filed on Apr. 17, 2003.

(51) Int. Cl.
| | | |
|---|---|---|
| A63F 13/428 | (2014.01) | |
| A41D 1/00 | (2018.01) | |
| A43B 3/00 | (2006.01) | |
| A41D 27/08 | (2006.01) | |
| A41D 13/00 | (2006.01) | |

(52) U.S. Cl.
CPC .............. *A41D 27/08* (2013.01); *A43B 3/001* (2013.01); *A43B 3/0078* (2013.01); *A63F 13/428* (2014.09); *A63F 13/98* (2014.09); *A41D 2600/10* (2013.01)

(58) Field of Classification Search
CPC ....... A63F 2300/1093; A63F 2300/609; A43B 1/0027; A43B 1/0036; A44C 5/0015; A41D 1/002; A41D 13/0015; A41D 19/0024; A41D 2600/10
See application file for complete search history.

(56) References Cited

U.S. PATENT DOCUMENTS

| | | | |
|---|---|---|---|
| 3,934,065 A | 1/1976 | Tung | |
| 4,104,102 A | 8/1978 | Eagon et al. | |
| 4,277,848 A * | 7/1981 | Boehland | A41D 1/04 2/115 |
| 4,510,704 A | 4/1985 | Johnson | |
| 4,517,685 A | 5/1985 | Lesley | |
| 4,542,897 A | 9/1985 | Melton et al. | |
| 4,651,446 A | 3/1987 | Yukawa et al. | |
| 4,716,458 A | 12/1987 | Heitzman et al. | |
| 4,743,971 A | 5/1988 | Hugli | |
| 4,752,764 A | 6/1988 | Peterson et al. | |
| 4,769,265 A | 9/1988 | Coburn, Jr. | |
| 4,771,394 A | 9/1988 | Cavanagh | |
| 4,808,471 A | 2/1989 | Grunzinger | |
| 4,828,257 A | 5/1989 | Dyer et al. | |
| 4,856,787 A | 8/1989 | Itkis | |
| 4,919,418 A | 4/1990 | Miller | |
| 4,925,189 A | 5/1990 | Braeunig | |
| 5,017,770 A | 5/1991 | Sigalov | |
| 5,089,960 A | 2/1992 | Sweeney, Jr. | |
| 5,203,848 A | 4/1993 | Wang | |
| 5,210,604 A | 5/1993 | Carpenter | |
| 5,213,555 A | 5/1993 | Hood et al. | |
| 5,235,416 A | 8/1993 | Stanhope | |
| 5,423,554 A | 6/1995 | Davis | |
| 5,456,648 A | 10/1995 | Edinburg et al. | |
| 5,466,200 A | 11/1995 | Ulrich et al. | |
| 5,524,637 A | 6/1996 | Erickson | |
| 5,547,439 A | 8/1996 | Rawls et al. | |
| 5,575,717 A | 11/1996 | Houriet, Jr. et al. | |
| 5,588,154 A | 12/1996 | Blauer et al. | |
| 5,594,469 A | 1/1997 | Freeman et al. | |
| 5,616,078 A | 4/1997 | Oh | |
| 5,626,537 A | 5/1997 | Danyo et al. | |
| 5,655,997 A | 8/1997 | Greenberg et al. | |
| 5,675,828 A | 10/1997 | Stoel et al. | |
| 5,720,200 A | 2/1998 | Anderson et al. | |
| 5,768,382 A | 6/1998 | Schneier et al. | |
| 5,785,632 A | 7/1998 | Greenberg et al. | |
| 5,794,267 A | 8/1998 | Wallace | |
| 5,864,333 A | 1/1999 | O'Heir | |
| 5,890,995 A | 4/1999 | Bobick et al. | |
| 5,890,997 A | 4/1999 | Roth | |
| 5,899,963 A | 5/1999 | Hutchings | |
| 5,916,063 A | 6/1999 | Alessandri | |
| 5,921,891 A | 7/1999 | Browne | |
| 5,941,797 A | 8/1999 | Kashiwaguchi | |
| 5,974,262 A | 10/1999 | Fuller et al. | |
| 5,982,352 A * | 11/1999 | Pryor | G01S 5/16 345/156 |
| 5,989,157 A | 11/1999 | Walton | |
| 6,013,007 A | 1/2000 | Root et al. | |
| 6,018,705 A | 1/2000 | Gaudet et al. | |
| 6,024,675 A | 2/2000 | Kashiwaguchi | |
| 6,050,924 A | 4/2000 | Shea | |
| 6,066,075 A | 5/2000 | Poulton | |
| 6,077,193 A | 6/2000 | Buhler et al. | |
| 6,122,340 A | 9/2000 | Darley et al. | |
| 6,122,960 A | 9/2000 | Hutchings et al. | |
| 6,128,783 A | 10/2000 | Blauer et al. | |
| 6,175,960 B1 | 1/2001 | Knittel | |
| 6,191,773 B1 * | 2/2001 | Maruno | H04N 21/4223 345/156 |
| 6,213,872 B1 | 4/2001 | Harada et al. | |
| 6,222,859 B1 | 4/2001 | Yoshikawa | |
| 6,231,527 B1 | 5/2001 | Sol | |
| 6,298,218 B1 | 10/2001 | Lowe et al. | |
| 6,298,314 B1 | 10/2001 | Blackadar et al. | |
| 6,405,381 B1 | 6/2002 | Bowman, Jr. | |
| 6,475,115 B1 | 11/2002 | Candito et al. | |
| 6,539,336 B1 | 3/2003 | Vock et al. | |
| 6,545,705 B1 | 4/2003 | Sigel et al. | |
| 6,572,511 B1 | 6/2003 | Volpe | |
| 6,585,622 B1 | 7/2003 | Shum et al. | |
| 6,595,858 B1 | 7/2003 | Tajiri et al. | |
| 6,605,038 B1 | 8/2003 | Teller et al. | |
| 6,669,600 B2 | 12/2003 | Warner | |
| 6,720,949 B1 * | 4/2004 | Pryor | A63F 13/02 345/156 |
| 7,106,360 B1 | 9/2006 | Frederick | |
| 8,206,219 B2 | 6/2012 | Shum et al. | |
| 9,162,142 B2 | 10/2015 | Shum et al. | |
| 9,517,406 B2 | 12/2016 | Shum et al. | |
| 9,597,598 B2 | 3/2017 | Shum et al. | |
| 2002/0019258 A1 | 2/2002 | Kim et al. | |
| 2002/0019296 A1 | 2/2002 | Freeman et al. | |
| 2002/0036617 A1 | 3/2002 | Pryor | |
| 2002/0077219 A1 | 6/2002 | Cohen et al. | |
| 2002/0083507 A1 | 7/2002 | Mullis | |
| 2002/0097247 A1 | 7/2002 | Ohba | |
| 2002/0160883 A1 | 10/2002 | Dugan | |
| 2002/0176575 A1 | 11/2002 | Qawami et al. | |
| 2003/0008714 A1 | 1/2003 | Tajiri et al. | |
| 2003/0016368 A1 | 1/2003 | Aman et al. | |
| 2003/0031062 A1 | 2/2003 | Tsurugai et al. | |
| 2003/0050537 A1 | 3/2003 | Wessel | |
| 2003/0063115 A1 | 4/2003 | Kaku et al. | |
| 2004/0017473 A1 | 1/2004 | Marks | |
| 2004/0063480 A1 * | 4/2004 | Wang | A63F 13/02 463/8 |
| 2004/0127334 A1 | 7/2004 | Heppert | |
| 2004/0127336 A1 | 7/2004 | Lapcevic | |

FOREIGN PATENT DOCUMENTS

| | | |
|---|---|---|
| JP | 63186711 | 11/1988 |
| JP | 04-127674 B2 | 4/1992 |
| JP | 05-161724 | 6/1993 |
| JP | 07-185131 | 7/1995 |
| JP | H08131654 A | 5/1996 |
| JP | H09248282 A | 9/1997 |
| JP | 2000-033184 | 2/2000 |
| JP | 2001129240 A | 5/2001 |
| JP | 2001155121 A | 6/2001 |
| JP | 2002500768 A | 1/2002 |
| JP | 2002519754 A | 7/2002 |
| JP | 2002-530970 | 9/2002 |
| JP | 2003221712 A | 8/2003 |

(56) References Cited

FOREIGN PATENT DOCUMENTS

| | | | | |
|---|---|---|---|---|
| JP | 2003316905 A | 11/2003 | | |
| JP | 2003333578 A | 11/2003 | | |
| JP | 2004264244 A | 9/2004 | | |
| JP | 2004313407 A | 11/2004 | | |
| JP | 2006077382 A | 3/2006 | | |
| JP | 2006086487 A | 3/2006 | | |
| WO | WO 9634310 A1 * | 10/1996 | ............. | A41D 27/08 |
| WO | 1999067702 A1 | 12/1999 | | |
| WO | 0031560 A2 | 6/2000 | | |
| WO | 0171397 A1 | 9/2001 | | |
| WO | 2005002436 A1 | 1/2005 | | |

OTHER PUBLICATIONS

Printout of Web page (Netpulse Frequent Fitness Program), dated Dec. 3, 1999, 3 pgs.
Printout of Web page from Interactive Fitness Technologies, Inc. (UltraCoach Standard), dated Nov. 30, 1999, 3 pgs.
Printout of Web page from Interactive Fitness Technologies. Inc. (UltraCoach Multi-Sport Training Software Products Catalog), dated Sep. 1999, 12 pgs.
Printout of Web page from Interactive Fitness Technologies, Inc. (UltraCoach VR: How it Works?), dated Nov. 30, 1999, 2 pgs.
Printout of Web page from Interactive Fitness Technologies, Inc. (UltraCoach VR Features), dated Nov. 30, 1999, 3 pgs.
Printout of Web page from Interactive Fitness Technologies, Inc. (UltraCoach Fit Software Comparisons), dated Nov. 30, 1999, 2 pgs.
Printout of Web page from Interactive Fitness Technologies, Inc. (UltraCoach Home Page), dated Nov. 30, 1999, 2 pgs.
Health Care. High-Tech Style. by Bernard Wyskockl, Jr:, The Well Street Journal, Apr. 17, 2001, 2 pgs.
Jan. 2, 2012—(EP) ESR—App. No. 09150346.6.
May 27, 2011—(EP) ESR—Application No. 10178921.2.
Guskov, I., "Efficient Tracking of Regular Patterns on Non-rigid Geometry", University of Michigan, 2002: 1057-1060.
May 31, 2011—(EP) ESR—App. No. 10150066.8.
Jun. 2, 2004—(WO) ISR—App. No. PCT/US2003/34286.
Jul. 24, 2012—(EP) ESR—App. No. 10179570.6.

\* cited by examiner

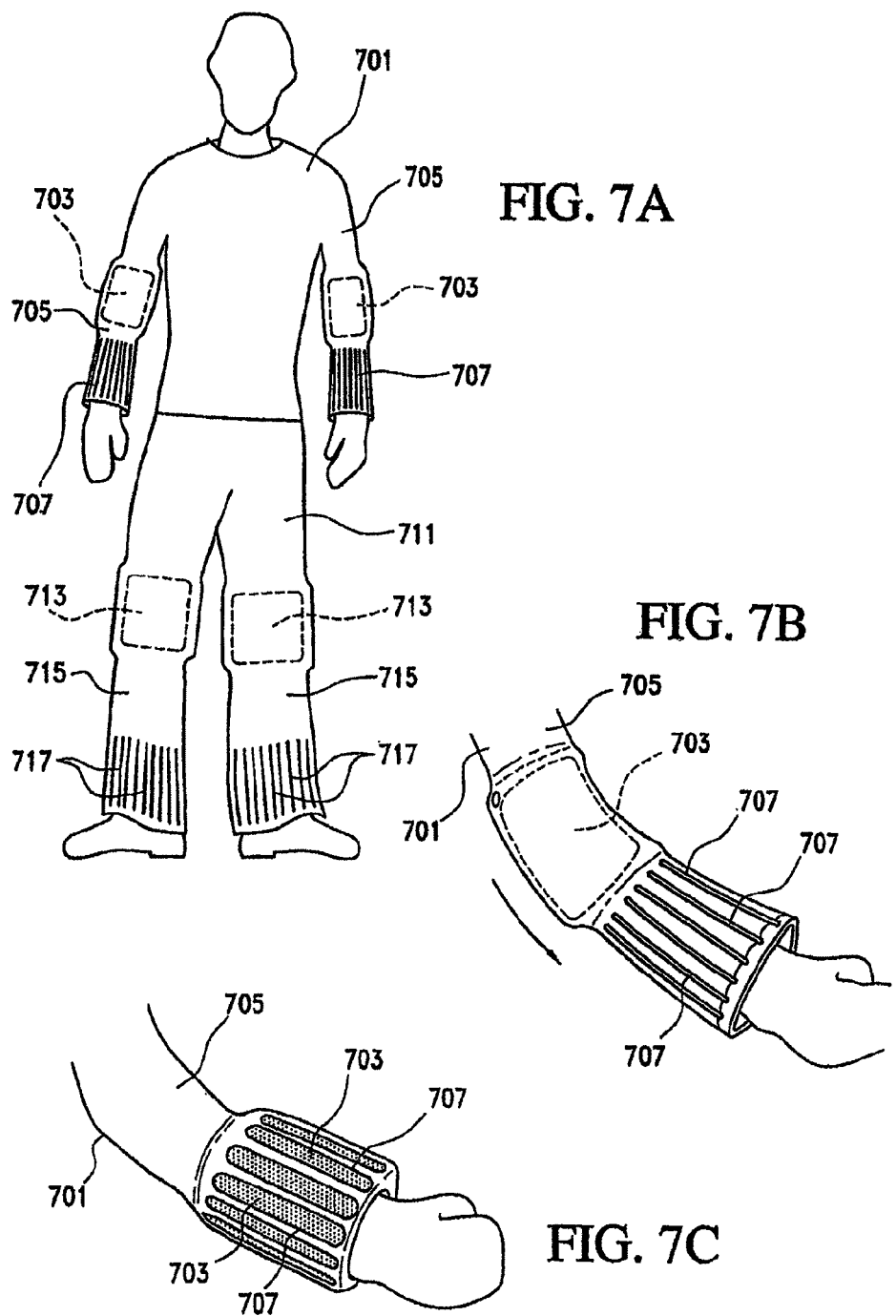

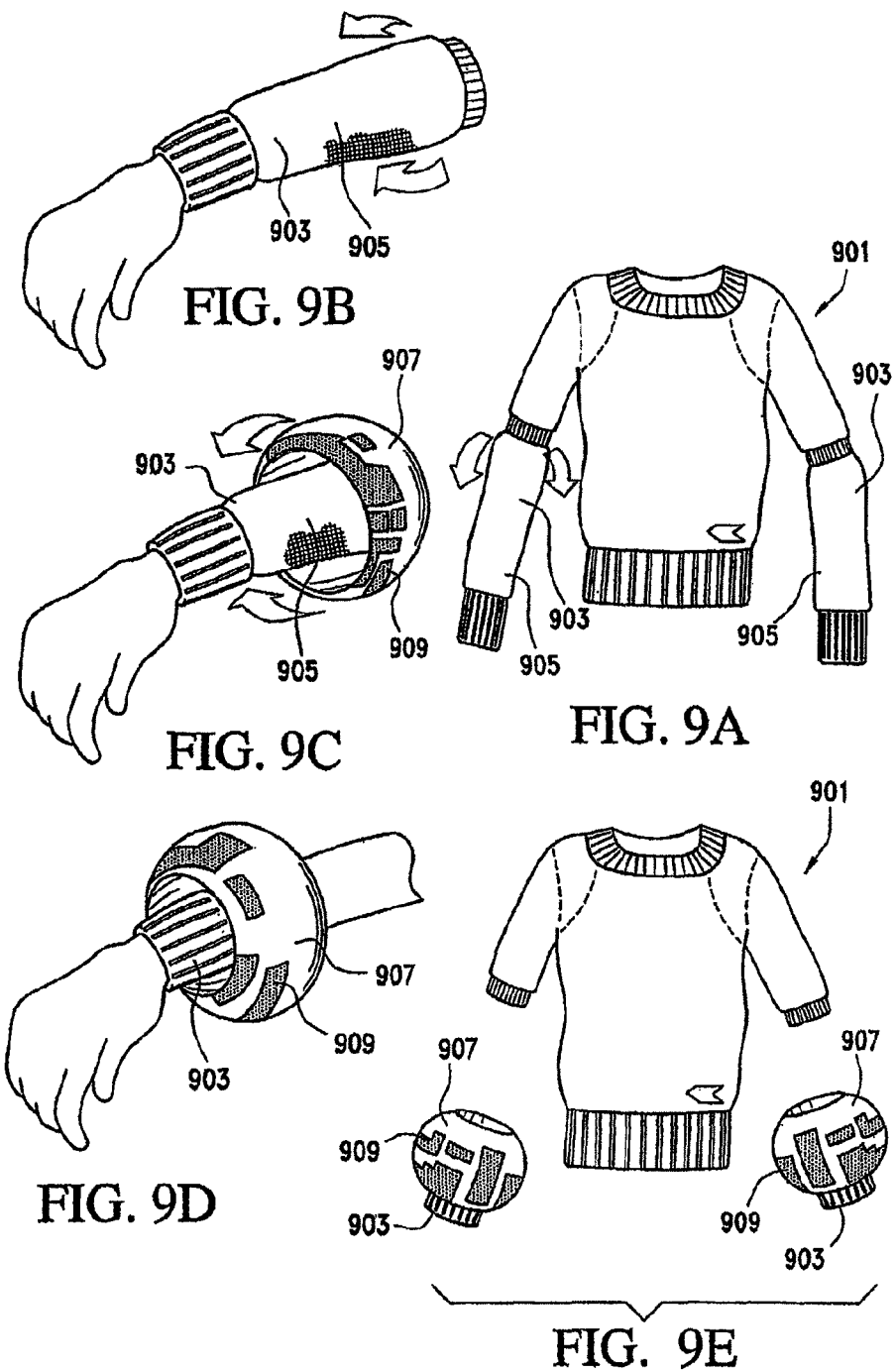

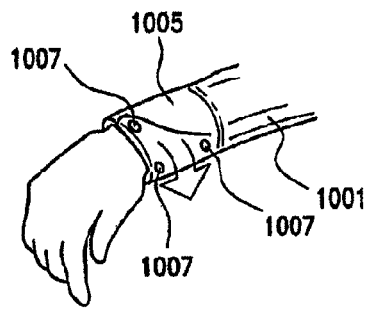
FIG. 10B
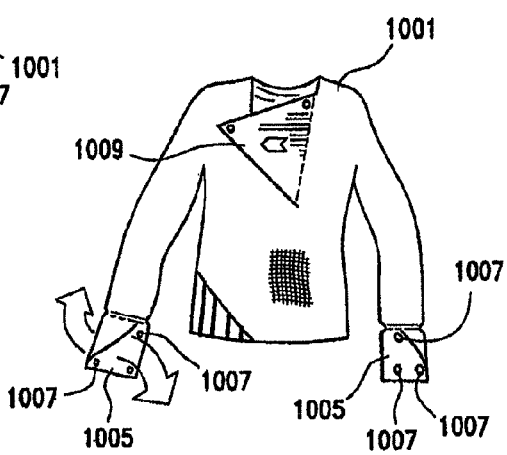
FIG. 10A
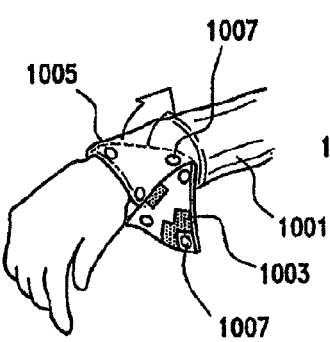
FIG. 10C
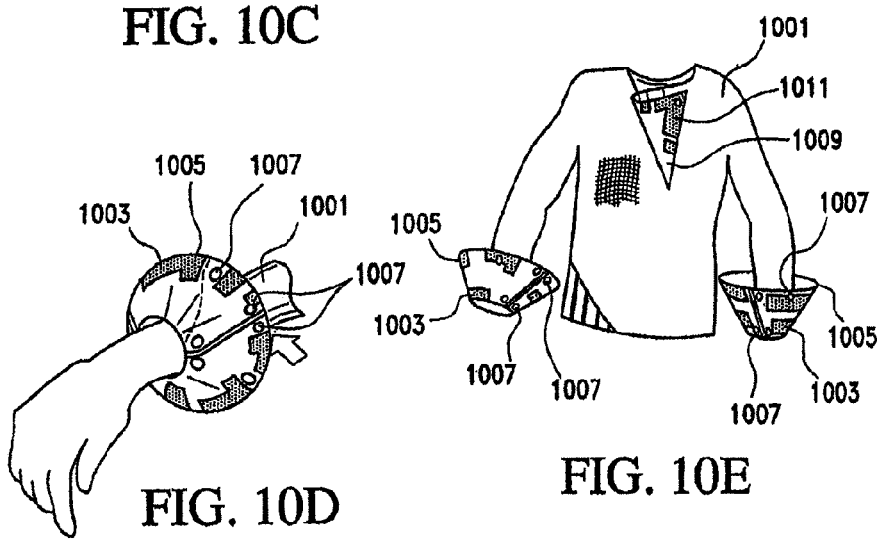
FIG. 10D
FIG. 10E

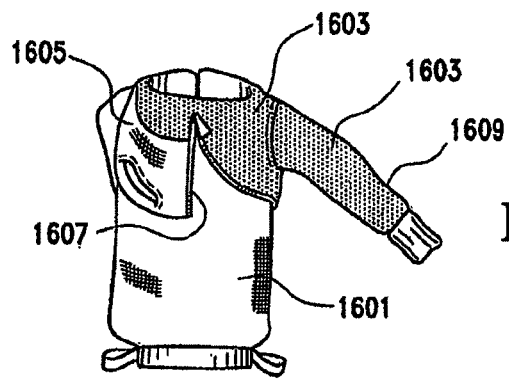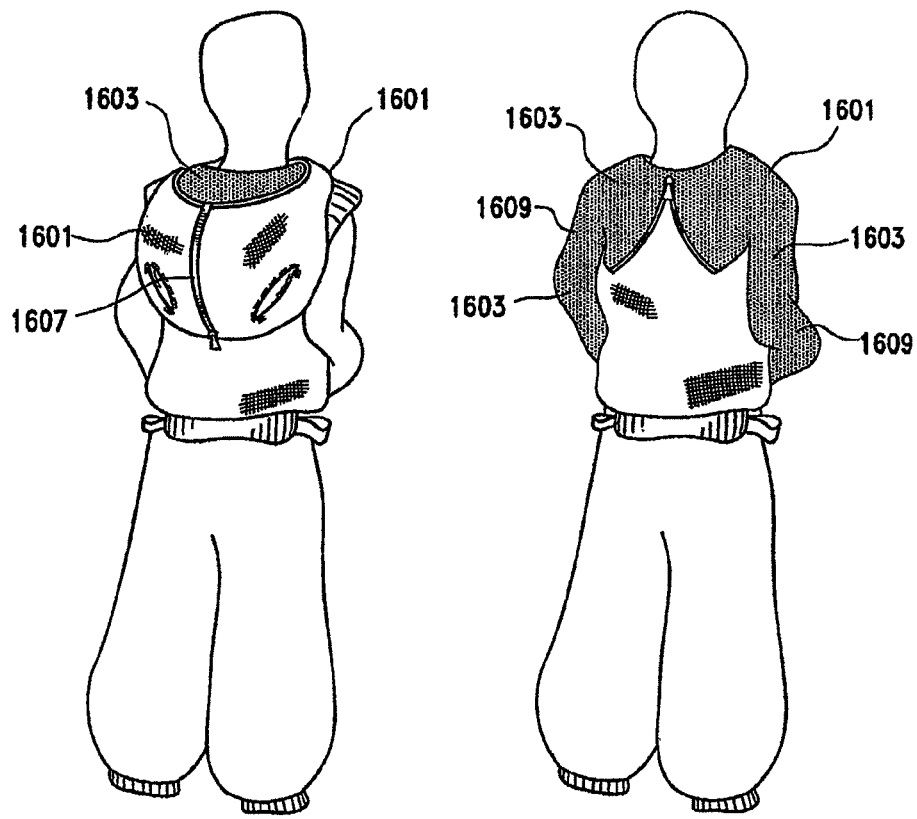
FIG. 16B
FIG. 16A  FIG. 16C

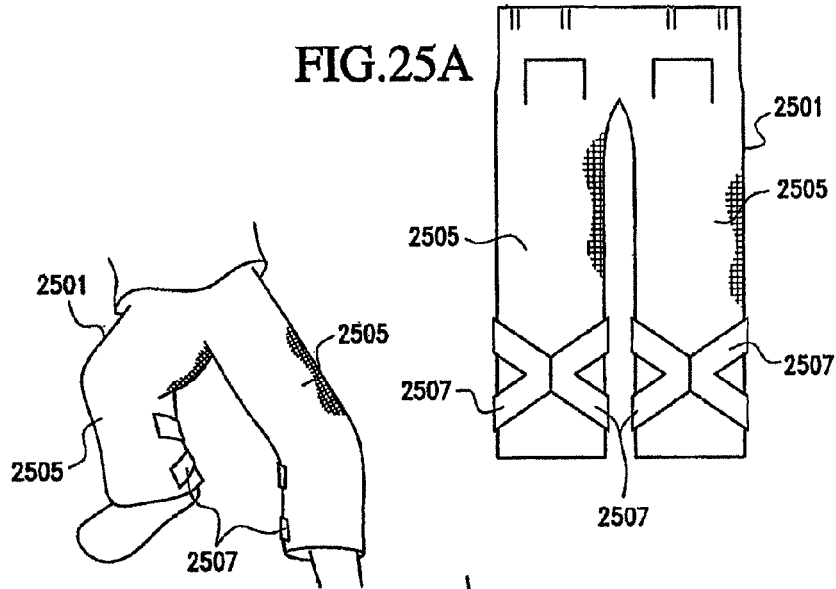
FIG.25A
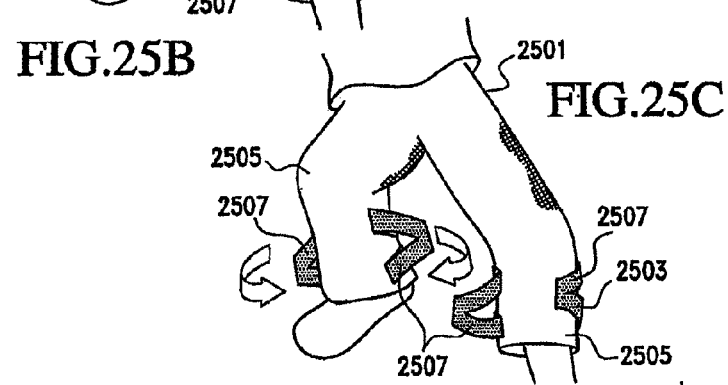
FIG.25B
FIG.25C
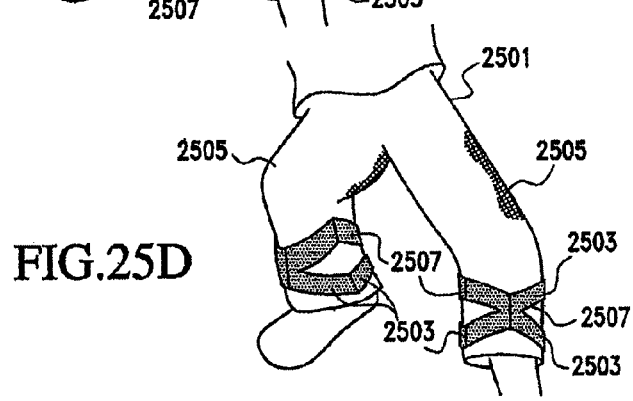
FIG.25D

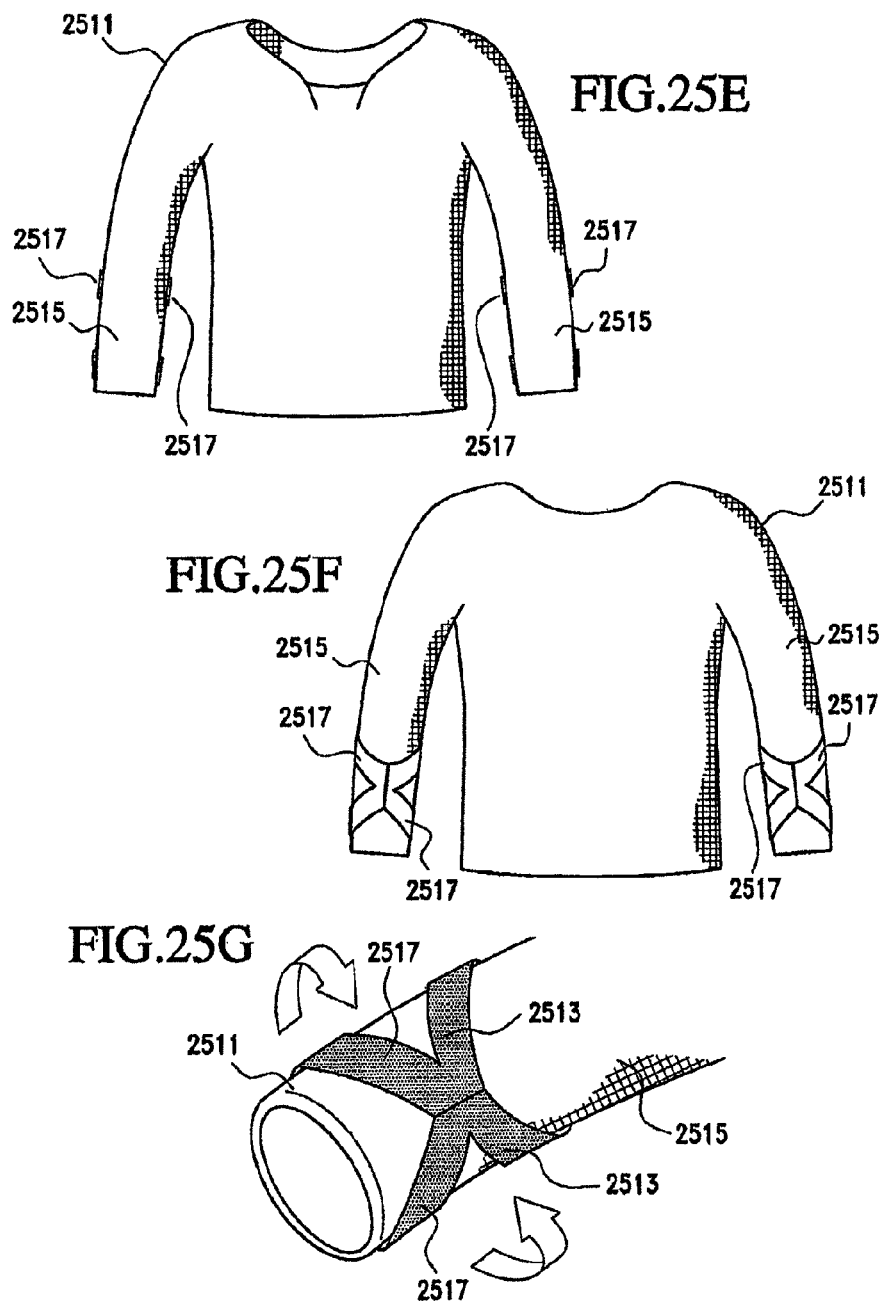

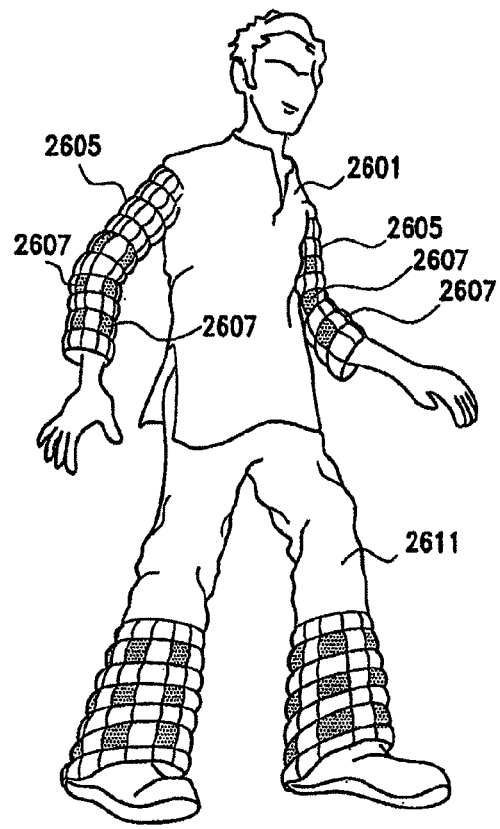
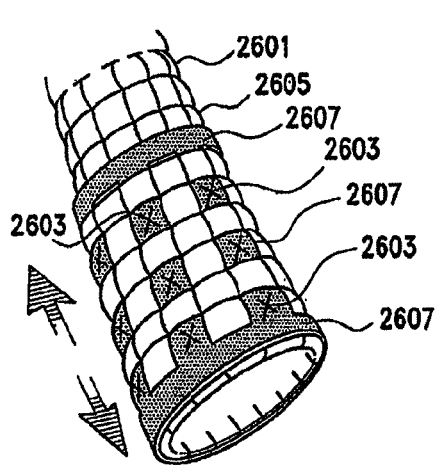
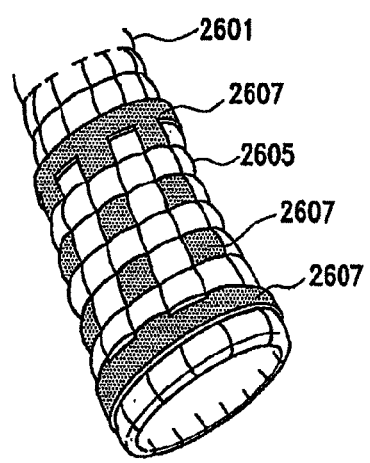
FIG.26A
FIG.26B
FIG.26C

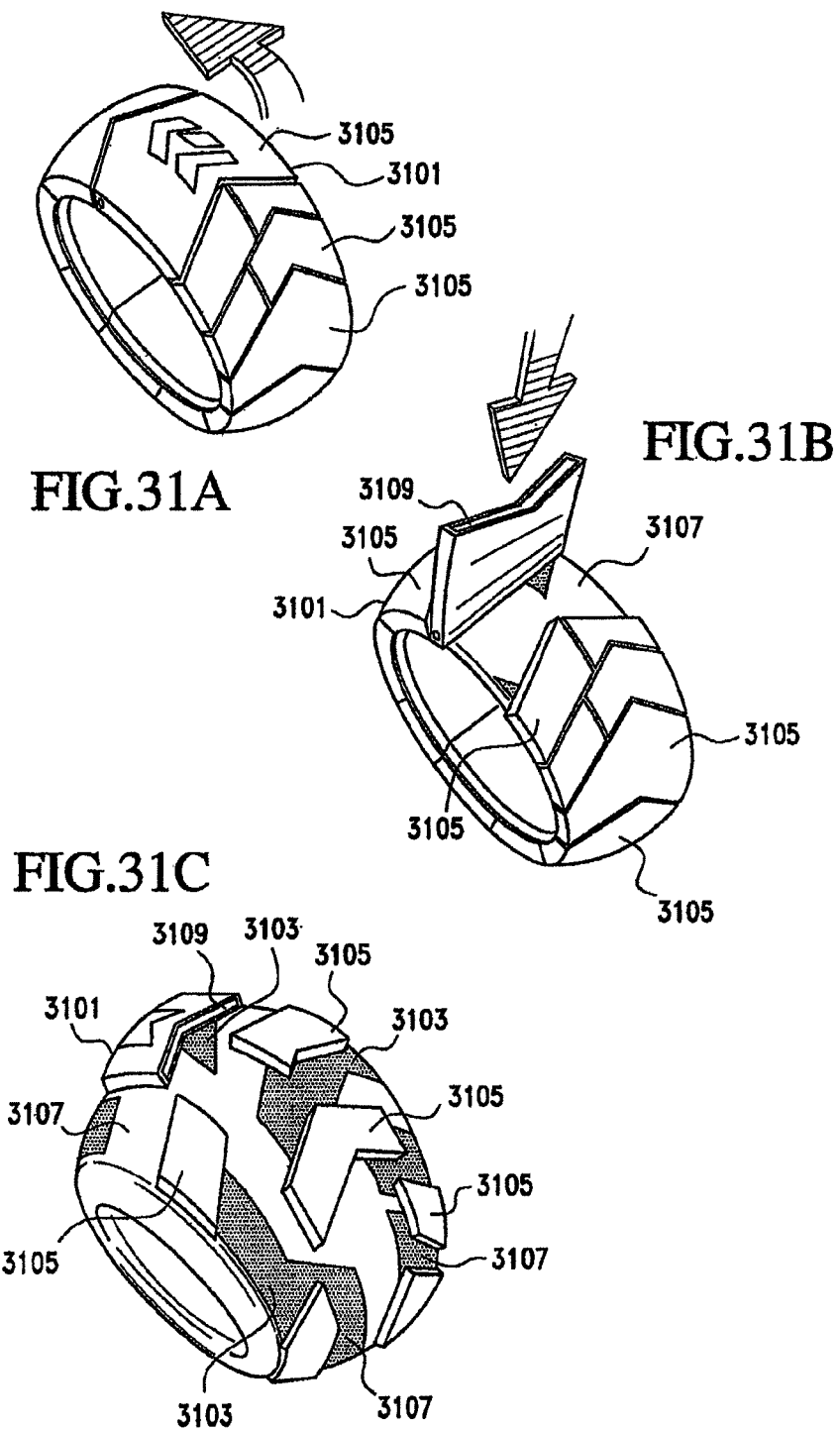

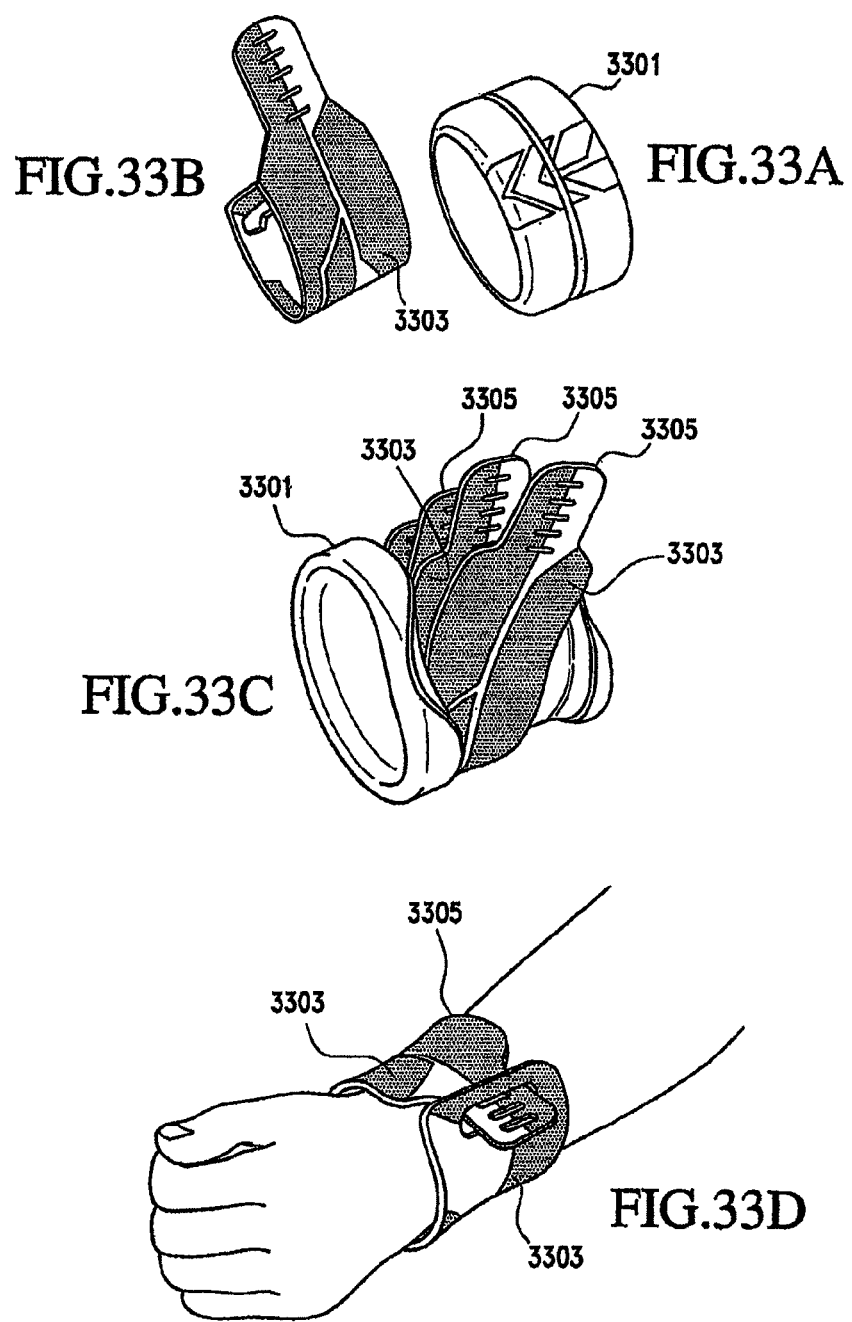

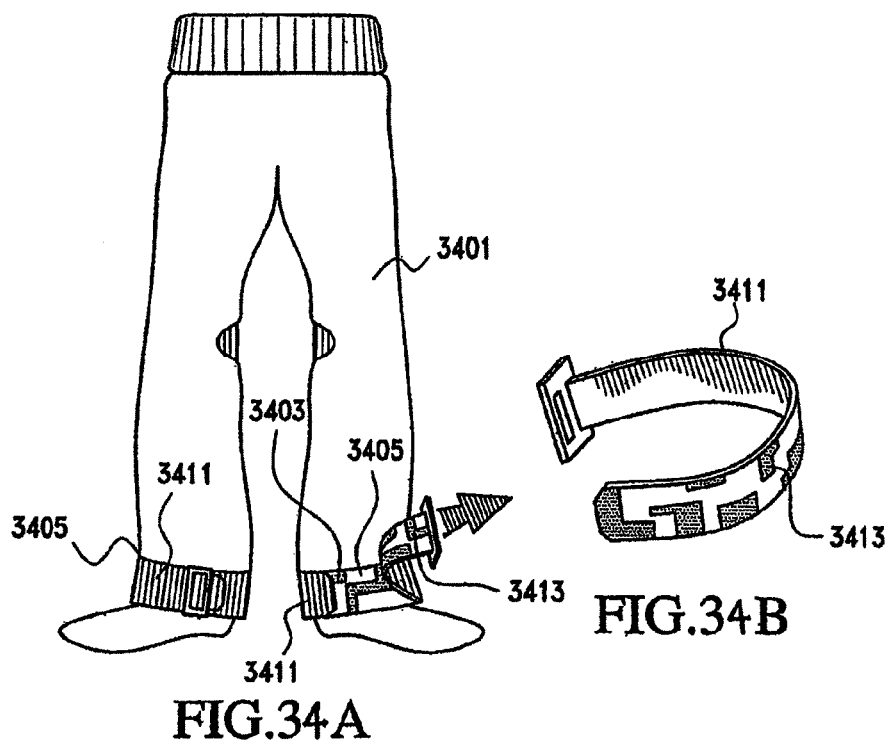
FIG.34A
FIG.34B
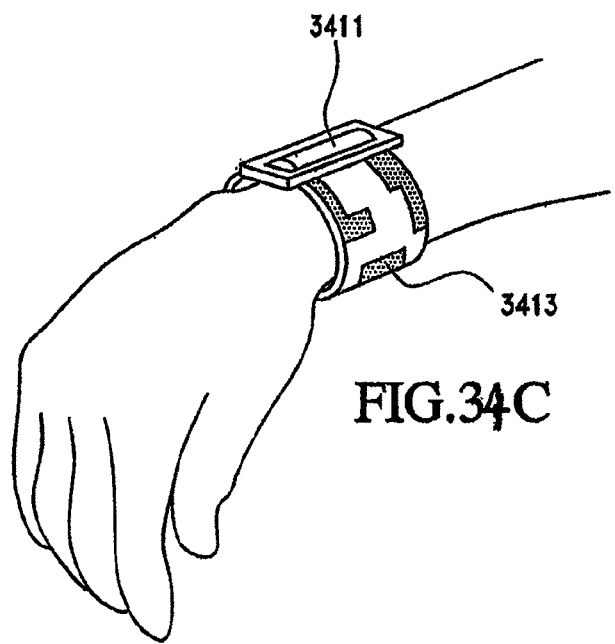
FIG.34C

SIGILS FOR USE WITH APPAREL

RELATED APPLICATION INFORMATION

This application is a continuation of U.S. application Ser. No. 14/848,631, filed Sep. 9, 2015, which is a continuation of U.S. application Ser. No. 12/626,120 filed Nov. 25, 2009, now U.S. Pat. No. 9,162,142, which is a continuation application of U.S. patent application Ser. No. 10/827,989, filed on Apr. 19, 2004, now abandoned, and claims priority to U.S. Provisional Patent Application No. 60/463,825 filed Apr. 17, 2003. U.S. patent application Ser. No. 10/827,989 is a continuation-in-part of U.S. application Ser. No. 10/286,396, filed Oct. 30, 2002, now U.S. Pat. No. 8,206,219. Each of these priority applications is incorporated entirely herein by reference.

FIELD OF THE INVENTION

The invention relates to the use of sigils, such as marks or devices for interacting with an image tracking or recognition system. Various aspects of the invention may be particularly applicable to apparel bearing sigils that can be used with interactive gaming or training devices, where the operation of the device is controlled in response to the wearer's movements. Various aspects of the invention also may be used to associate information with the wearer of apparel bearing a sigil.

BACKGROUND OF THE INVENTION

In recent years, the sophistication and capability of computers has steadily increased. As they have, the number of uses of computers for both business and recreation has increased as well. For example, computer-based virtual reality devices that provide feedback based upon the identification of a user or the detection of a user's physical movements have grown in popularity. These devices (generally referred to hereafter as interactive activity devices for convenience) include, for example, computer games. With these games, a user moves his or her own arms, legs, head or entire body location in order to accomplish the goals of the computer game. Interactive activity devices also include electronic training devices, which are used to improve desired skills for a wide variety of athletic activities or job tasks. For example, with some types of interactive electronic training devices, a user may practice a particular movement of a body part and receive feedback in response, to indicate whether the user is moving in the desired manner.

While a number of different interactive activity devices are growing in use, the tools employed by a user to control these devices are often primitive. For example, many interactive activity devices require that a user wear an unwieldy and sometimes uncomfortable accessory that will allow the device to track the position of the user. These accessories may be, for example, a belt or bands with a prominent reflective disk in front for reflecting infrared waves.

In addition to tracking a user's movement, many computers now are being employed to recognize images. That is, computers now are being used to identify an image and then associate particular information with that image. For example, optical character recognition software can distinguish the letter "T" from the letter "q." Based upon this recognition, another software program, such as a word processing program, can employ an ASCII value for the recognized character "T." Still other uses of image recognition include retina pattern and fingerprint scans for personal identification, obstacle and boundary recognition for automobile guidance, and document watermark recognition for navigating a browser to an Internet site associated with the watermark. While techniques for pattern recognition have become very sophisticated, however, pattern recognition is not typically employed in such day-to-day activities as electronic gaming, athletics, or shopping.

BRIEF SUMMARY OF THE INVENTION

Advantageously, various examples of the invention provide sigils in the form of a graphic mark or marks. Apparel with these marks can be conveniently and comfortably employed by the user of an interactive activity device, and yet may still accurately be detected by the device. Some examples of the invention relate to apparel displaying graphic marks as tracking marks that can be visible tracked by an interactive activity device. The apparel may be convertible from one form, in which the tracking marks are partially or completely hidden, to another form in which the tracking marks are prominently displayed for detection by an interactive activity device. Alternately or additionally, the apparel may include tracking marks made from material that appears highly reflective to an interactive activity device, but which does not appear highly reflective to a casual observer.

Other examples of the invention may include apparel with sigils in the form of electronic targets for detecting a user's movement. For example, the apparel may be footwear with an accelerometer that indicates when a user has stepped upon a surface, the degree of pressure applied by the footwear against a surface, or both. Also, some types of electronic targets may transmit an electromagnetic signal, such as a light, infrared or ultrasound signal, to indicate their position (and thus the position of a user's body part) to an interactive activity device. Still further, some electronic targets may determine their position using, for example, radio triangulation, and then transmit their position (and the position of a user's body part) to an interactive activity device.

Still other embodiments of the invention may provide sigils in the form of graphic marks that can be recognized by, e.g., a computer system. For example, some embodiments of the invention may provide apparel displaying graphic marks that can be recognized by an interactive activity device. The interactive activity device may then take some action upon recognizing a graphic mark according to various implementations of the invention. Thus, if the interactive activity device is a game, then it may provide a player wearing apparel bearing a graphic mark with access to a game level or playing environment that is not otherwise available. Alternately or additionally, apparel bearing a graphic mark according to the invention may be recognized by, e.g., a computer in a retail sales location or at a sporting event. Upon recognizing the graphic mark, the computer system may arrange for the wearer to receive a purchase credit, coupon, or other reward or prize. Further, the computer system may store information relating to the wearer in a database, and subsequently employ that information to provide the wearer with, e.g., product or sports information.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

FIG. 7A is a front elevational view of two types of apparel according to yet another embodiment of the invention, particularly a shirt bearing tracking marks and a pair of pants bearing tracking marks, the apparel being in a configuration to conceal the tracking marks.

FIG. 7B is a first partial perspective view of a sleeve of the apparel depicted in FIG. 7A, the apparel being in a configuration to conceal the tracking marks.

FIG. 7C is a second partial perspective view of the sleeve of the apparel depicted in FIG. 7A, the apparel being in a configuration to expose the tracking marks.

FIG. 9A is a first front elevational view of apparel, particularly a shirt bearing tracking marks according to yet another embodiment of the invention, the apparel being in a configuration to conceal the tracking marks.

FIG. 9B is a first partial perspective view of a sleeve of the apparel depicted in FIG. 9A, the apparel being in a configuration to conceal the tracking marks.

FIG. 9C is a second partial perspective view of the sleeve of the apparel depicted in FIG. 9A.

FIG. 9D is a third partial perspective view of the sleeve of the apparel depicted in FIG. 9A, the apparel being in a configuration to expose the tracking marks.

FIG. 9E is a second front elevational view of the apparel depicted in FIG. 9A, the apparel being in a configuration to expose the tracking marks.

FIG. 10A is a first front elevational view of apparel, particularly a shirt bearing tracking marks according to yet another embodiment of the invention, the apparel being in a configuration to conceal the tracking marks.

FIG. 10B is a first partial perspective view of a sleeve of the apparel depicted in FIG. 10A, the apparel being in the configuration to conceal the tracking marks.

FIG. 10C is a second partial perspective view of the sleeve of the apparel depicted in FIG. 10A.

FIG. 10D is a third partial perspective view of the sleeve of the apparel depicted in FIG. 10A, the apparel being in a configuration to expose the tracking marks.

FIG. 10E is a second front elevational view of the apparel depicted in FIG. 10A, the apparel being in the configuration to expose the tracking marks.

FIG. 16A is a first perspective view of apparel, particularly a shirt bearing tracking marks according to yet another embodiment of the invention, the apparel being in a configuration to conceal the tracking marks.

FIG. 16B is a second perspective view of the apparel depicted in FIG. 16A.

FIG. 16C is a third perspective view of the apparel depicted in FIG. 16A, the apparel being in a configuration to expose the tracking marks.

FIG. 25A is a front elevational view of apparel, particularly a pair of pants bearing tracking marks according to yet another embodiment of the invention, the apparel being in a configuration to conceal the tracking marks.

FIG. 25B is a first perspective view of the apparel depicted in FIG. 25A, the apparel being in the configuration to conceal the tracking marks.

FIG. 25C is a second perspective view of the apparel depicted in FIG. 25A.

FIG. 25D is a third perspective view of the apparel depicted in FIG. 25A, the apparel being in a configuration to expose the tracking marks.

FIG. 25E is a front elevational view of apparel, particularly a shirt bearing tracking marks according to yet another embodiment of the invention, the apparel being in a configuration to conceal the tracking marks.

FIG. 25F is a back elevational view of apparel depicted in FIG. 25E, the apparel being in the configuration to conceal the tracking marks.

FIG. 25G is a perspective view of a sleeve of the apparel depicted in FIG. 25E, the apparel being in a configuration to expose the tracking marks.

FIG. 26A is a perspective view of two types of apparel, particularly a shirt bearing tracking marks and a pair of pants bearing tracking marks according to yet other embodiments of the invention, the apparel being in configurations to conceal the tracking marks.

FIG. 26B is a first partial perspective view of a sleeve of the apparel depicted in FIG. 26A, the apparel being in the configuration to conceal the tracking marks.

FIG. 26C is a second partial perspective view of the sleeve of the apparel depicted in FIG. 26A, the apparel being in a configuration to expose the tracking marks.

FIG. 31A is a first perspective view of apparel, particularly a band bearing tracking marks according to yet another embodiment of the invention, the apparel being in a configuration to conceal the tracking marks.

FIG. 31B is a second perspective view of the apparel depicted in FIG. 31A.

FIG. 31C is a third perspective view of the apparel depicted in FIG. 31A, the apparel being in a configuration to expose the tracking marks.

FIG. 33A is a first perspective view of apparel, particularly a band bearing tracking marks according to yet another embodiment of the invention, the apparel being in a configuration to conceal the tracking marks.

FIG. 33B is a second perspective view that depicts an additional band of the apparel depicted in FIG. 33A.

FIG. 33C is a third perspective view of the apparel depicted in FIG. 33A.

FIG. 33D is a fourth perspective view of apparel depicted in FIG. 33A that shows the additional band in a configuration to expose the tracking marks.

FIG. 34A is a front elevational view of apparel, particularly a pair of pants bearing tracking marks and a band bearing tracking marks according to yet another embodiment of the invention, one leg portion of the pants being in a configuration to conceal the tracking marks.

FIG. 34B is a first perspective view of the band depicted in FIG. 34A.

FIG. 34C is a second perspective view of the band depicted in FIG. 34A.

DETAILED DESCRIPTION OF THE INVENTION

Overview

Figure 1:
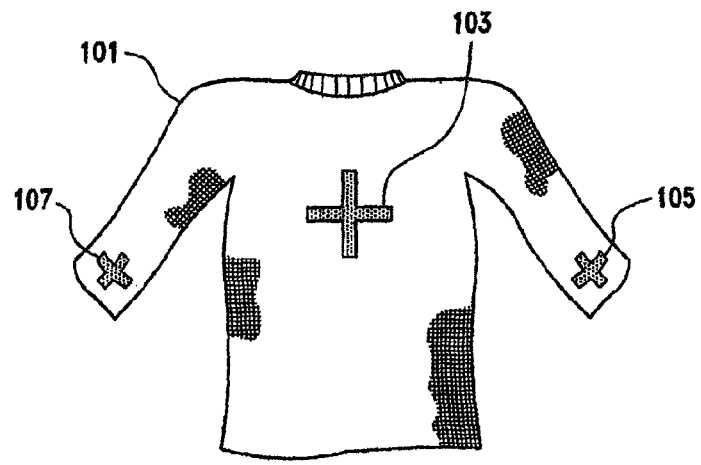
FIG. 1 illustrates apparel employing tracking marks according to one embodiment of the invention.

Various examples of the invention relate to the use of sigils that may be worn or otherwise carried by a user, and which will cause a device, such as a computer, to perform a function associated with the sigil. For example, a sigil according to various embodiments of the invention may take the form of a graphic mark that can be conveniently and comfortably displayed on apparel worn by the user of an interactive activity device, and yet may still accurately be detected by the device. With some examples of the invention, the graphic marks may serve as tracking marks that can be positionally tracked by the interactive activity device. The apparel may be convertible from one form, in which the tracking marks are partially or completely hidden, to another form in which the tracking marks are prominently displayed for detection by an interactive activity device. With other embodiments of the invention, a graphic mark may alternately or additionally cause a device to take some action when the mark is recognized. For example, a particular graphic mark may be provided on apparel for use with an interactive game. When the game recognizes that graphic mark, the game may then provide the player wearing the graphic mark with access to a game environment that would otherwise be unavailable.

With still other examples of the invention, a sigil according to the invention may take the form of an electronic target that allows another device to detecting a user's movement. For example, the sigil may be an accelerometer provided in footwear that indicates when a user has stepped upon a surface, the degree of pressure applied by the footwear against a surface, or both. Further, with some types of electronic targets, the electronic target may transmit an electromagnetic signal, such as a light, infrared or ultrasound signal, to indicate its position (and the position of a user's body part) to another device, such as an interactive activity device. With still other types of electronic targets, the target may determine its position using, for example, radio triangulation, and then transmit its position (and the position of a user's body part) to another device, such as an interactive activity device.

Still other embodiments of the invention may provide sigils in the form of graphic marks that can be recognized by a device, such as a computer system, so as to prompt the device to perform some function. For example, some embodiments of the invention may provide apparel displaying graphic marks that can be recognized by an interactive activity device. The interactive activity device may then take some action upon recognizing a graphic mark according to various implementations of the invention. Thus, apparel bearing a graphic mark according to various embodiments of the invention may be recognized by, e.g., a computer in a retail sales location or at a sporting event. Upon recognizing the graphic mark, the computer system may arrange for the wearer to receive a purchase credit, coupon, or other reward or prize. Further, the computer system may store information relating to the wearer in a database, and subsequently employ that information to provide the wearer with, e.g., product or sports information.

Interactive Activity Devices

Tracking Marks

FIG. 1 illustrates one example of a piece of apparel according to various embodiments of the invention. As seen in this figure, the apparel bears a plurality of graphic marks in the form of tracking marks. More particularly, FIG. 1 shows a shirt 101 that includes a chest tracking mark 103, a left cuff tracking mark 105, and a right cuff tracking mark 107. Each of these tracking marks 103-107 may have a distinctive appearance, such as the appearance of a cross shape as shown in FIG. 1. Moreover, each tracking mark 103-107 faces toward the front of the shirt 101 (that is, toward the front of a user wearing the shirt 101), so that the tracking marks 103-107 will appear in images taken by one more cameras of an interactive activity device used by the wearer.

In the illustrated embodiment, the remainder of the shirt 101 other than the tracking marks 103-107 may be a different color from the tracking marks 103-107, to provide good contrast between the tracking marks 103-107 and the remainder of the shirt 101. For example, the tracking marks 103-107 may be bright white, while the remainder of the shirt 101 may be a dark blue, brown, or black. This high contrast between the tracking marks 103-107 and the background of the shirt 101 will assist an interactive activity device employing a camera to distinguish the tracking marks 103-107 from the background provided by the shirt 101. Moreover, the distinctive cross shape of the tracking marks 103-107 may assist a suitably-programmed interactive activity device to identify and distinguish these marks 103-107 from the background provided by the shirt 101. For example, the cross-shaped tracking marks 103-107 be useful when the interactive activity device is programmed to distinguish a cross shape from other shapes imaged by a camera or cameras.

As will be appreciated by those of ordinary skill in the art, the tracking marks 103-107 can be applied to the shirt 101 using a variety of techniques. For example, the tracking marks 103-107 may be stitched to the shirt 101, adhered to the shirt 101 using any suitable adhesive, or woven or knitted into the material of the shirt 101. Further, the tracking marks 103-107 can be printed onto the shirt 101 using a pad printing technique. The tracking marks 103-107 also can be heat transferred onto the shirt 101, die sublimated onto the shirt 101, or simply died into the material of the shirt 101. In addition, the tracking marks 103-107 can be glued onto the shirt 101, impregnated into the shirt 101 using, for example, thermoforming, or etched into the material of the shirt 101. Still further, the tracking marks 103-107 can be permanently mechanically attached to the shirt 101 using any suitable fastening mechanism, such as pins or staples. It should also be appreciated that, where desired, each tracking mark 103-107 can be applied to the shirt 101 using a different technique. For example, the chest tracking mark 103 may be stitched to the shirt 101, while the left cuff and right cuff tracking marks 105 and 107 may be silk screened onto the sleeves of the shirt 101.

Use of Tracking Marks with an Interactive Activity Device

Figure 2:
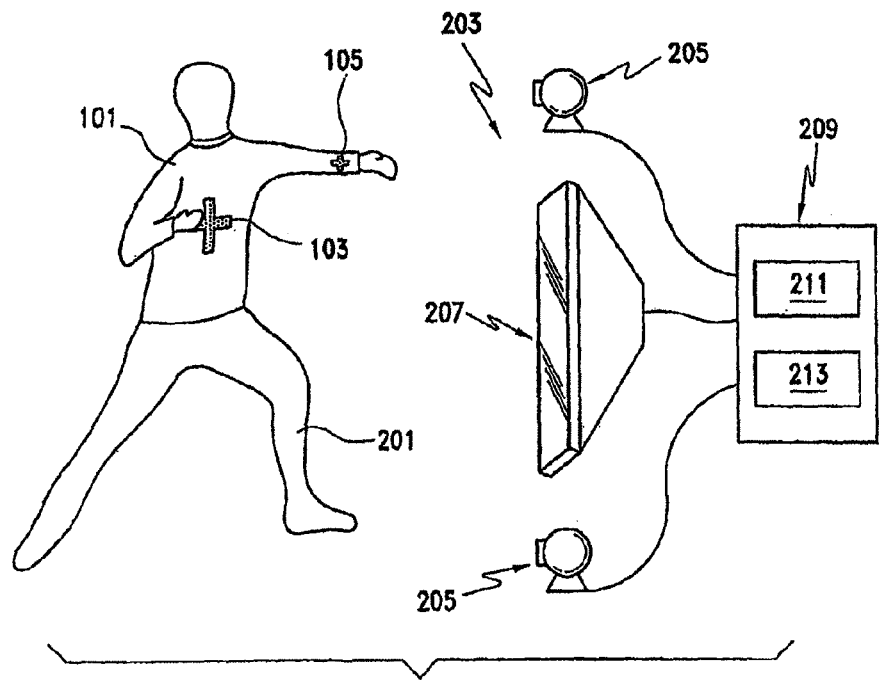
FIG. 2 illustrates the use of the apparel illustrated in FIG. 1 with an interactive computer game.

The use of the shirt 101 according to one embodiments of the invention is shown in FIG. 2. As seen in this figure, a user 201 dons the shirt 101, and stands before an interactive activity device 203 which, in the illustrated embodiment, may be an interactive game. More particularly, the user 201 stands within the playing area defined for the interactive computer game 203. The interactive computer game 203 includes a pair of video cameras 205 and a display monitor 207. The interactive computer game 203 also includes a processing unit 209. The processing unit 209 has a tracking mark recognition module 211 and a response module 213. The tracking mark recognition module 211 receives images from the cameras 205. From these images, the tracking mark identification module 211 identifies one or more tracking marks in the visual fields of the cameras 205, and determines the movement, if any, of the identified tracking marks.

For example, the tracking mark identification module 211 may employ an algorithm to identify a tracking mark by distinguishing pixels having a particular color in an image obtained by a camera 205 from pixels in that image of other colors. Alternately, the tracking mark identification module 211 may identify a tracking mark by distinguishing the brightness of pixels corresponding to the tracking mark from the other pixels in an image obtained by the camera 205. Still further, the identification module 211 may identify a tracking mark by distinguishing pixels of a relatively uniform brightness, shade, or color that are arranged in a particular shape. Thus, an interactive activity device may distinguish pixels corresponding to a tracking mark arranged in a cross shape from pixels having a similar color, shade or brightness arranged in another shape.

Once the tracking mark identification module 211 identifies one or more tracking marks, it then determines the movement of the identified tracking marks. Algorithms for determining the movement of identified images are well known in the art, and thus will not be discussed here in further detail. For example, the tracking mark identification module 211 may use the "city block" method of determining the three-dimensional position of an imaged tracking mark by comparing the position of a specific location on the mark in the image from one camera 205 with the position of the same location on the tracking mark in a simultaneous image from another camera 205, for the entire area of the tracking mark.

With some embodiments of the invention, the tracking mark identification module 211 may additionally determine movement of the user's extremities from the detected movement of the tracking marks. For example, using inverse kinematics, the tracking mark identification module 211 may determine that a user has moved his or her right forearm based upon the detected rotation of one tracking mark (located at the user's wrist) about another stationary tracking mark (located at the user's elbow). The use of reverse kinematics is also well known in the art, and thus will not be described here in detail.

Based upon the detected movement of the tracking marks, the response module 213 then provides a corresponding response on the monitor 207. For example, the interactive activity device may be an interactive game. If the objective of the game is for the player to position himself or herself so as to block a virtual soccer ball from entering a virtual goal, then the response module 213 will determine if the movement of any of the tracking marks 103-107 will place that tracking mark between the virtual soccer ball and the virtual goal. If the response module 213 determines that one of the tracking marks 103-107 has moved to a virtual location between the virtual soccer ball and the virtual goal, then the response module 213 may display a soccer ball moving away from the player 201, indicating that the player has successfully blocked the ball. On the other hand, if the response module 213 determines that the movement of the tracking marks 103-107 does not place a tracking mark between the virtual soccer ball and the virtual goal, then the response module 213 may display a scoring indicator indicating that the player 201 has given up a point in a virtual soccer game.

It should be noted that, with various embodiments of the invention, the tracking mark identification module 211 (or a separate recognition module) may additionally recognize a tracking mark and then associate qualitative information with one or more of the tracking marks. Thus, a user may wear apparel that displays a special tracking mark, such as a specific number or pattern. Upon recognizing this number or pattern, the interactive activity device 203 may then provide the operation of the interactive activity device with one or more special features of functions.

For example, if the interactive activity device 203 is a virtual soccer goal-blocking game, the user may wear a shirt bearing the number of a soccer player that is particularly good at blocking high shots on the goal. When the tracking mark identification module 211 (or separate recognition module) recognizes the number, the game 203 may then relax the user's requirements for successfully blocking a "high" virtual shot on the virtual goal. Alternately, if the interactive activity device 203 provides a training program to assist a user in exercising with handheld or strapped-on weight, the tracking mark identification module 211 may recognize the mass of the weight from its color, and the game 203 will then adjust the training program accordingly.

Still further, the interactive activity device 203 may use the qualitative information to allow the wearer's access (or, alternately, block the wearer's access to) various features of the interactive activity device 203. For example, if the interactive activity device 203 is a game, then the device 203 may provide the wearer of a specific tracking mark with access to a particular game environment (which may include a particular game "level"). Further, the device 203 may provide a wearer with access to statistics associated with the wearer's mark. Accordingly, if the game is, e.g., a basketball simulation game, wearing a tracking mark corresponding to the uniform number of a particular professional basketball player may provide the wearer with access to the wearer's own game statistics and/or the real playing statistics for that professional basketball player.

Moreover, the qualitative information from a tracking mark may be used to start a game within the game that the wearer is playing. That is, a game player wearing a particular tracking mark may be able to employ the mark to open another type of electronic game embedded within the game that the wearer is already playing. A wearer of a particular tracking mark thus may be able to, for example, preview or play without restriction a new game that is embedded within the game that the wearer is already playing. Further, the tracking mark can be used to access game play with a particular player over a network, or to invoke game preferences or other previously-saved information associated with the wearer's tracking mark.

The use of tracking marks may be particularly beneficial for playing a game (or performing some other interactive function) over a network of interconnected computing devices, such as the Internet or a local intranet. For example, with some embodiments of the invention, the interactive activity device 203 may allow a person wearing a particular tracking mark to access a specific network site (such as an Internet page) based upon qualitative information represented by or associated with a tracking mark. Again, if the interactive activity device 203 is a game, then the wearer of a particular tracking mark may be able to use the qualitative information represented by that mark to access a network site corresponding to a specific gaming group or to another game player. Thus, the interactive activity device 203 may contact other users over a network based upon a recognized graphic mark.

With some of these embodiments, the interactive activity device 203 may use the tracking marks only to obtain such qualitative information. The game 203 may then determine the user's position or movements using techniques other than with the tracking marks, such as by conventional infrared, visible light or sonic positioning and motion detection techniques.

In addition to statically providing qualitative information, the tracking marks may also provide qualitative information when moved. For example, the tracking mark identification module 211 (or separate recognition module) may recognize particular movements or motions of one or more tracking marks as character information or instructional information. Thus, with some embodiments of the invention, a user may make a particular motion with one or more tracking marks, and the tracking mark identification module 211 (or separate recognition module) will recognize these motions to be an instruction to, e.g., turn off the game, change the type or characteristics of the game, input alphanumeric information, or provide other information to the interactive activity device 203.

Active Tracking Targets

As previously noted, various embodiments of the invention may include or employ apparel bearing sigils in the form of an active target that can be tracked by an interactive activity device. An active tracking target may, for example, be an electronic device that transmits a signal over one or more frequencies of electromagnetic radiation. Thus, an active tracking target may transmit a light signal, an infrared signal, an ultrasound signal or a radio signal to the interactive activity device. This signal can then be received by the interactive activity device and used to determine the position of the target by, for example, conventional triangulation techniques.

Still further, some active tracking targets according to various embodiments of the invention may detect movement of the user. These targets will then transmit the detected information to the interactive activity device. For example, apparel according to some embodiments of the invention may include one or more accelerometers for detecting the speed and/or direction of a user's arm, leg, or other extremity, or even for detecting the speed and/or direction of the user himself or herself. Accelerometers positioned in footwear also may be used to detect when a user places his or her foot down against a surface, the force with which a user places his or her foot down against a surface, or both. With these types of tracking targets, the accelerometers may be coupled with a transmitter, so that the information detected by the accelerometers can be transmitted to the interactive activity device for determining the user's motion.

With various embodiments of the invention, some tracking targets are intelligent in addition to being active. This type of tracking target, may, for example, determine its own position relative to the interactive activity device, and provide that position information directly to the interactive activity device. For example, some electronic devices are capable of using electromagnetic signals to triangulate their position to within a few inches. Accordingly, these types of electronic devices may be used to determine the position of user's hand, arm, foot, leg or other body part, or even the position of the user himself or herself. This position information can then be transmitted to the interactive activity device. The interactive activity device can use the position information to determine the user's movement.

Recognition Devices

In addition to being used with interactive activity devices that track a user's position, various embodiments of the invention may employ sigils with recognition devices. In these embodiments, the recognition device recognizes the sigil and then associates some qualitative information with that sigil. The recognition device (or some other device related to the recognition device) may then perform some additional function based upon the associated qualitative information.

For example, with some embodiments of the invention, the recognition device may be a computer that receives images through a camera, such as a CCD camera. With these embodiments, a sigil according to the invention may be a graphic mark displayed on a user's apparel or otherwise carried by a user. When the user passes in front of the camera, the computer recognizes the graphic mark, and associates some qualitative information with the graphic mark.

With some embodiments of the invention, the graphic mark may be unique. With these embodiments, the qualitative information may include individualized information, such as the name of a person registered as the wearer of the graphic mark, organizations with which the registered wearer is affiliated, and information generated based upon previous instances in which the graphic mark was recognized. With still other embodiments, however, the graphic mark will not be unique, but will instead be associated with a group, product or other feature that may be common to multiple persons. With these embodiments, the qualitative information may be generic information, such as characteristics of the product or a related product, an incrementation of a register of the number of persons wearing or otherwise using the product, an incrementation of a register of the number of persons affiliated with the group, and/or a list of items or activities associated with the product or the group.

A recognition device according to various embodiments of the invention may, for example, be employed in a retail setting. As noted above, if a person is wearing apparel bearing a unique graphic mark, then the recognition device can associate specific information with that graphic mark. In a retail setting, for example, the recognition device may identify purchasing preferences or a purchasing history for a wearer. Based upon this information, the recognition device (or another related device) may then award the wearer with credit, coupons or other rewards for the purchase or rent of goods and services. Alternately or additionally, the recognition device or other related device may direct the wearer to products or services based upon the wearer's purchase history or other information associated with the wearer.

If a person is wearing apparel with a graphic mark common to a group, product, or other feature, then the recognition device (or another related device) may identify purchasing preferences or a purchasing history associated with the relevant group, product, or feature. The recognition device or other device may then direct the wearer to specific products or services, or award the wearer with credit, coupons or other rewards based upon the information identified from the graphic mark. Further, recognition of graphic marks can be used to develop purchasing preferences or a purchasing history, for both individuals and for a group, product, or other feature corresponding to a graphic mark.

With various embodiments of the invention, a graphic mark may also be used in, for example, a sports setting. Thus, a recognition device at a sporting event may be used to identify competitors in the event, their coaches or trainers, or other persons related to the competitors. Alternately or additionally, a recognition device may be used to identify spectators at sporting events. For example, if the sporting event is a soccer game, some spectators may wear apparel displaying a graphic mark associated with one soccer team, while other spectators may wear apparel displaying a different graphic mark associated with the opposing soccer team. According to various embodiments of the invention, one or more recognition devices may be employed to determine how many spectators are affiliated with each team based upon recognition of the different graphic marks.

It should be noted that a recognition device according to various embodiments of the invention may employ any type of recognition technique to recognize a graphic mark. As noted above, various recognition techniques are known and employed for, e.g., facial character recognition, character recognition, retina pattern and fingerprint recognition and the like.

Graphic Marks
Configurable Apparel Bearing Graphic Marks

The various graphic marks 103-107 on shirt 101 are positioned externally and are generally exposed when player 201 is wearing shirt 101. As discussed above, graphic marks 103-107 may be formed to have relatively high contrast with respect to other portions of shirt 101, or graphic marks 103-107 may be formed to have a particular shape, color, or reflectivity, for example. Graphic marks 103-107 may, therefore, be a prominent feature of shirt 101. In some instances, however, a wearer will not want his or her apparel to prominently display a graphic mark. For example, player 201 may prefer that graphic marks 103-107 be concealed in order to provide shirt 101 with a relatively conventional appearance when player 201 is not engaged in playing interactive computer game 203 or when player 201 is in a public area, for example.

Similarly, when player 201 is within a playing area of interactive computer game 203, the positions of graphic marks 103-107 are detected and tracked by interactive computer game 203. Under some circumstances, other individuals that are wearing apparel bearing graphic marks may also be within the playing area. The other individuals, however, may wish to remain undetected by interactive computer game 203. For example, the other individuals may be preparing to take part in interactive computer game 203, or the other individuals may be attempting to view display monitor 207 in order to evaluate the ability of player 201 to progress through the various challenges posed by interactive computer game 203. When the other individuals are within the playing area, the graphic marks on the apparel of the other individuals may be inadvertently detected by interactive computer game 203, thereby affecting the game play of player 201. Accordingly, the other individuals may wish to conceal the various graphic marks to limit inadvertent detection by interactive computer game 203.

The following material discloses various types of apparel that each includes an article of wear and at least one sigil in the form of a graphic mark. The articles of wear may vary significantly within the scope of various embodiments of the present invention to include shirts, pants, socks, shoes, hats, and wristbands, for example. Further, the articles of wear may be configured to selectively conceal the graphic marks from view or to selectively expose the graphic marks. Accordingly, a person wearing example of this apparel may conceal the graphic marks in public areas or conceal the graphic marks to prevent detection by an interactive activity device (or a recognition device) is desired. Similarly, the wearer may expose the graphic marks when detection by an interactive activity device (or a recognition device) is desired.

Some applications for an interactive activity device, such as computer game 203, may require that the position of the hands be detected. For example, a computer game that simulates the game of volleyball may include game play that involves setting or otherwise hitting a volleyball. Accordingly, apparel in the form of a shirt may be utilized in conjunction with graphic marks positioned on the sleeves to provide interactive computer game 203 with accurate data concerning the position of the arms or hands. A shirt may also include one or more graphic marks positioned on the torso area to provide interactive computer game 203 with data concerning the position of the body.

Figure 3A:
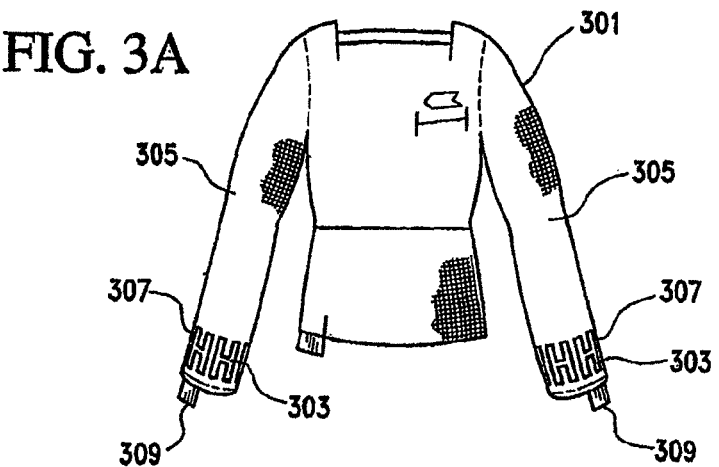
FIG. 3A is a front elevational view of apparel, particularly a shirt bearing tracking marks according to another embodiment of the invention, the apparel being in a configuration to conceal the tracking marks.
Figure 3B:
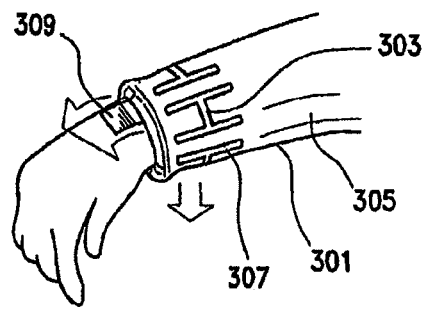
FIG. 3B is a first partial perspective view of a sleeve of the apparel depicted in FIG. 3A.
Figure 3C:
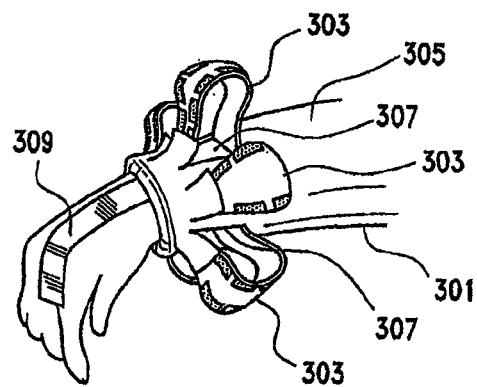
FIG. 3C is a second partial perspective view of a sleeve of the apparel depicted in FIG. 3A, the apparel being in configuration to expose the tracking marks.

Apparel having a long-sleeved shirt 301 and a pair of graphic marks 303 is depicted in FIGS. 3A-3C. In contrast with shirt 101, wherein graphic marks 103-107 are positioned externally and are generally exposed when a wearer is wearing shirt 101, an individual may selectively conceal or expose graphic marks 303. With reference to FIGS. 3A and 3B, graphic marks 303 are depicted as being positioned within sleeves 305 of shirt 301, thereby placing shirt 301 in a concealed configuration wherein graphic marks 303 are generally not visible and not detectable by interactive computer game 203. With reference to FIG. 3C, however, one of graphic marks 303 is depicted as protruding through a plurality of apertures 307 defined in one of sleeves 305. Accordingly, FIG. 3C depicts shirt 301 in an exposed configuration, wherein graphic marks 305 are exposed and generally detectable by an interactive activity device.

Each of sleeves 305 are formed from two concentric layers of material, and graphic marks 303 are positioned between the layers when shirt 301 is in the concealed configuration. A pair of tabs 309 is secured to graphic marks 303 and is utilized to convert shirt 301 from the concealed configuration to the exposed configuration. An end portion of each tab 309 extends from a wrist opening in each of sleeves 305. In order to convert shirt 301 from the concealed configuration to the exposed configuration, the individual grasps tabs 309 and pulls tabs 309 outward, thereby drawing graphic marks 303 toward the wrist openings and causing graphic marks 303 to flex outward and protrude through apertures 307.

Graphic marks 303 have the structure of a plurality of elongate strips that are arranged in a generally circular or cylindrical manner within sleeves 305. In addition, graphic marks 303 are formed from a material that flexes outward when shirt 301 is in the exposed configuration and returns to a substantially planar configuration when shirt 301 is in the concealed configuration. Accordingly, a variety of flexible materials, such as textiles, rubber, or various polymer materials, may be utilized to form graphic marks 303. In order to ensure that graphic marks 303 are detectable by a desired interactive activity device, each graphic mark 303 may have a relatively high contrast with respect to other portions of shirt 301, or each graphic mark 303 may have a particular color, pattern, shape, or reflectivity.

Tabs 309 may also form a detectable portion of graphic marks 303 when shirt 301 is in the exposed configuration, thereby increasing the total detectable area of graphic marks 303. In the concealed configuration, relatively small portions of tabs 309 extend outward from the wrist openings, as depicted in FIGS. 3A and 3B. In the exposed configuration, however, significantly larger portions of tabs 309 extend outward from the wrist openings and cover a portion of the hand, as depicted in FIG. 3C. Openings formed in the ends of tabs 309 may be placed around fingers to retain shirt 301 in the exposed configuration. When the individual intends to convert shirt 301 from the exposed configuration to the concealed configuration, the openings may be removed from the fingers and graphic marks 303 will retreat into apertures 307 and become substantially concealed.

Graphic marks 303, as depicted in FIGS. 3A-3C and discussed above, are positioned adjacent the wrist openings of shirt 301. The general concept of utilizing a tab to selectively conceal or expose graphic marks embedded within apparel may be applied to other areas of a shirt, such as the elbow area, shoulder area, or torso area, for example. Accordingly, the general structure of graphic marks 303 may be applied to other areas of a shirt to provide an interactive activity device with data concerning the positions of the other areas. Furthermore, this general structure could be applied to other types of apparel, such as a pair of pants. For example, the general structure of graphic marks 303 could be applied to an area adjacent ankle openings of the pants to provide an interactive activity device with data concerning the positions of the feet or ankles. One skilled in the relevant art will recognize, therefore, that the general structure disclosed with respect to shirt 303 may be applied to a variety of locations on the body and a variety apparel types.

Based upon the above discussion, shirt 301 and graphic marks 303 provide apparel for interactive activity devices that is convertible from a concealed configuration to an exposed configuration. In the concealed configuration, graphic marks 303 are substantially concealed from view and generally are not detectable by an interactive activity device. In the exposed configuration, however, graphic marks 303 are exposed and thus can be tracked by an interactive activity device. Additional articles of apparel that are convertible from a concealed configuration to an exposed configuration will be discussed in the following material.

Figure 4:
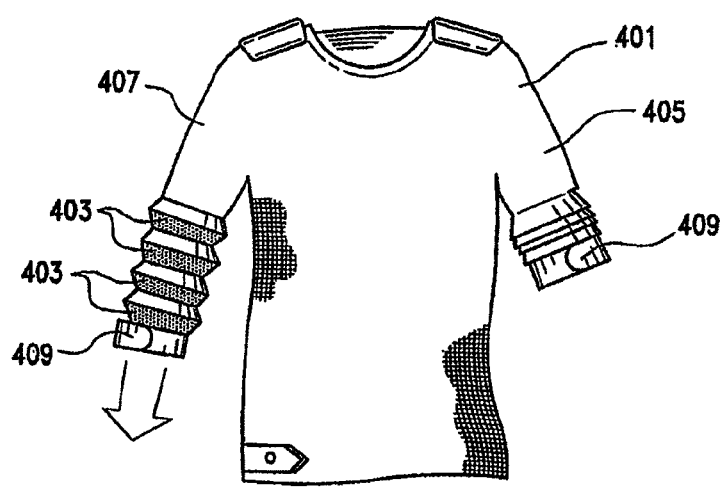
FIG. 4 is a front elevational view of apparel, particularly a shirt bearing tracking marks, according to yet another embodiment of the invention.

Another type of apparel in accordance with the present invention, which includes a shirt 401 and graphic marks 403, is depicted in FIG. 4. Graphic marks 403 are located on a right sleeve 405 and a left sleeve 407 of shirt 401. As represented in FIG. 4, right sleeve 405 is in a concealed configuration that substantially conceals one of graphic marks 403. Left sleeve 407, however, is in an exposed configuration, wherein one of graphic marks 403 is visible and trackable by an interactive activity device.

Sleeves 405 and 407 have a corrugated structure that compresses and expands in the manner of an accordion. The corrugated structure has surfaces that alternately face toward a shoulder area of shirt 401 and face toward a wrist opening of shirt 401. The various surfaces that face the shoulder area are formed to have properties, such as color, texture, and reflectivity, which are substantially similar to a remainder of shirt 401. The various surfaces that face the wrist opening, however, include the graphic marks 403, which have a contrast, color, shape, or reflectivity, for example, which is detectable and trackable by an interactive activity device.

Right sleeve 405 is depicted in FIG. 4 as being in the concealed configuration. Accordingly, the corrugated structure of right sleeve 405 is compressed such that the surfaces having graphic marks are hidden from view, and the other surfaces are visible. A strap 409 that encircles the wrist opening of right sleeve 405 may be utilized by the individual to secure right sleeve 405 in the concealed configuration. In contrast with right sleeve 405, left sleeve 407 is depicted in FIG. 4 as being in the exposed configuration. Accordingly, the corrugated structure of left sleeve 407 is expanded such that the surfaces having graphic marks are exposed and trackable by an interactive activity device. A strap 409 that encircles the wrist opening of left sleeve 407 may be utilized by the individual to secure left sleeve 407 in the exposed configuration.

Shirt 401 is structured such that the graphic mark 403 positioned on the right sleeve 407 may be concealed or exposed independently of the graphic mark 403 that is positioned on the left sleeve 407. One skilled in the relevant art will recognize that the ability to independently conceal and expose graphic marks 403 may have benefits in specific applications for interactive activity devices. For example, an interactive activity device that simulates the game of bowling may be most effective if only one graphic mark 403 is detectable, thereby providing the interactive activity device with data concerning only the hand that grasps and releases the bowling ball.

Figure 5A:
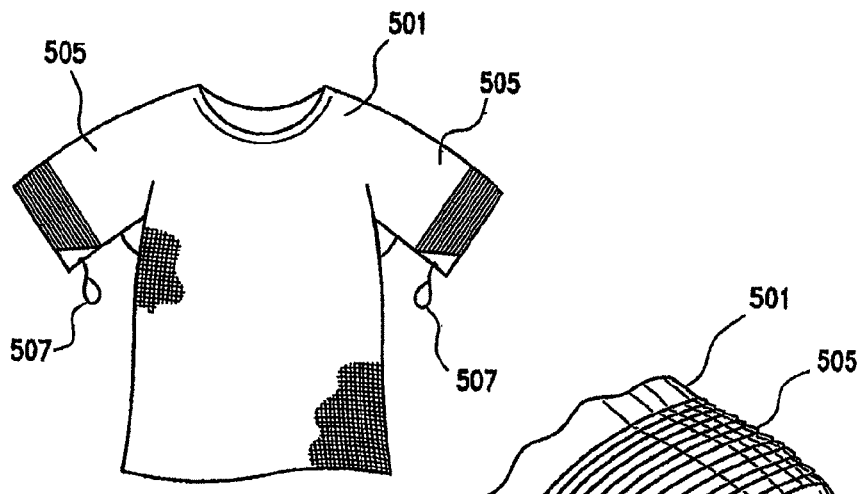
FIG. 5A is a front elevational view of apparel, particularly a shirt bearing tracking marks according to another embodiment of the invention.
Figure 5B:
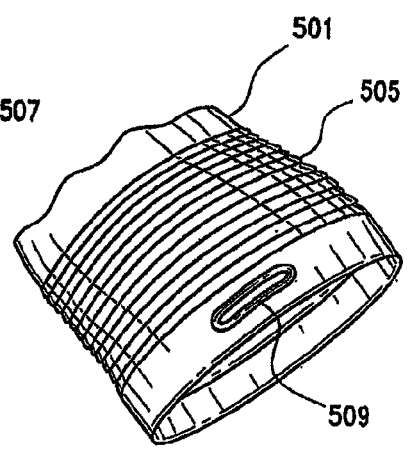
FIG. 5B is a first partial perspective view of a sleeve of the apparel depicted in FIG. 5A, the apparel being in a configuration to conceal the tracking marks.

When converting shirt 401 from the concealed configuration to the exposed configuration, sleeves 405 and 407 are effectively converted from a short-sleeve configuration to a long-sleeve configuration. In other words, the length of sleeves 405 and 407 increase in the process of converting shirt 401 from the concealed configuration to the exposed configuration. FIGS. 5A to 5C disclose similar apparel, particularly a shirt 501 having graphic marks 503, wherein a pair of sleeves 505 also increase in length during the conversion from the concealed configuration to the exposed configuration. Sleeves SOS each have a corrugated structure that compresses and expands in the manner of an accordion. When sleeves 505 are compressed, as depicted in FIGS. 5A and 5B, graphic marks 503 are concealed. When sleeves SOS are expanded, as depicted in FIG. 5C, graphic marks 503 are exposed and may be tracked by an interactive activity device.

A pair of drawstrings 507 and thumb apertures 509 are utilized to retain shirt 501 in the concealed configuration and the exposed configuration, respectively. Drawstrings 507 extend around sleeves 505 and may be tightened or loosened in a conventional manner. When tightened, drawstrings will effectively prevent sleeves SOS from expanding and inadvertently placing shirt 501 in the exposed configuration. Alternately, elastic elements within sleeves SOS or straps may be present to retain shirt 501 in the concealed configuration. When sleeves SOS are expanded and tracking marks 503 are exposed, a thumbs or other finger is placed within each thumb aperture 509 to prevent sleeves SOS from contracting. Accordingly, thumb apertures 509 may be utilized to retain shirt 501 in the exposed configuration.

Figure 5D:
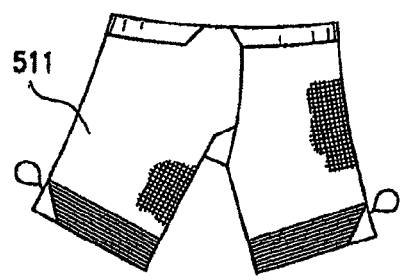
FIG. 5D is a front elevational view of apparel, particularly a pair of pants bearing tracking marks according to another embodiment of the invention.
Figure 5C:
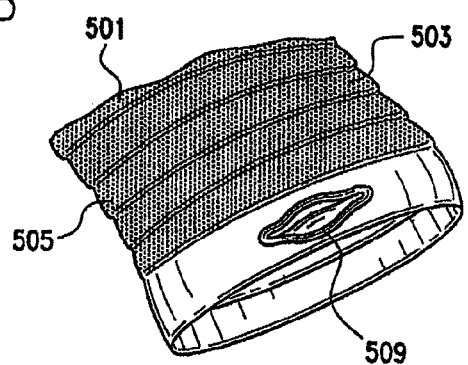
FIG. 5C is a second partial perspective view of a sleeve of the apparel depicted in FIG. 5A, the apparel being in configuration to expose the tracking marks.

Apparel having a similar structure is depicted in FIG. 5D as a pair of pants 511 that have graphic marks (not shown). Leg portions of pants 511 operate in a manner that is similar to sleeves 505 of shirt 501, thereby expanding to expose the graphic marks and contracting to conceal the graphic marks. Whereas shirt 501 includes thumb apertures 509 to retain shirt 501 in the exposed configuration, a pair of straps that extend under the feet may be utilized in pants 511 to retain the leg portions in the exposed configuration.

Figure 6A:
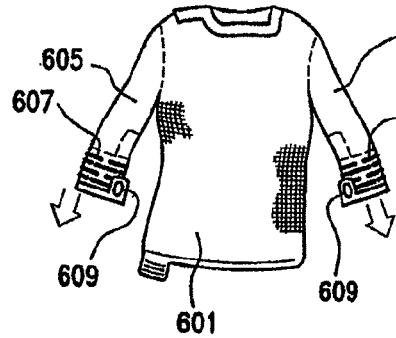
FIG. 6A is a first front elevational view of apparel, particularly a shirt bearing tracking marks according to yet another embodiment of the invention, the apparel being in a configuration to conceal the tracking marks.
Figure 6B:
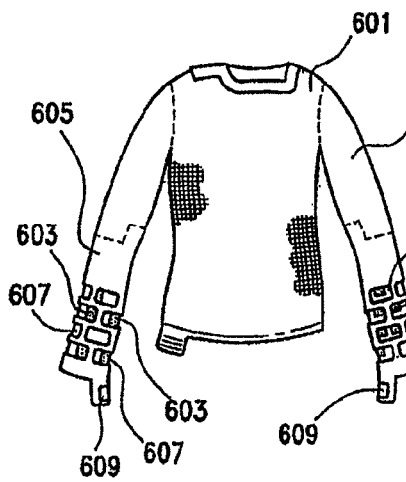
FIG. 6B is a second front elevational view of the apparel depicted in FIG. 6A, the apparel being in a configuration to expose the tracking marks.

Apparel in the form of a shirt 601 having graphic marks 603 is depicted in FIGS. 6A and 6B. Shirt 601 includes sleeves 605 formed of a resilient, elastic material that defines a plurality of apertures 607. Graphic marks 603 are positioned behind apertures 607. As illustrated in FIG. 6A, shirt 601 is in the concealed configuration, wherein apertures 607 are substantially closed and graphic marks 603 are not generally detectable by an interactive activity device. When sleeves 605 are expanded, as depicted in FIG. 6B, the material forming sleeves 605 expands and apertures 607 open, thereby exposing graphic marks 603. Thumb apertures 609 that are formed in each of sleeves 605 may also receive thumbs of the individual to retain sleeves 605 in the expanded and exposed configuration. When the individual desires to modify shirt 601 to the concealed configuration, the thumbs may be removed from thumb apertures 609 and the elasticity of sleeves 605 will operate to close apertures 607 in the manner depicted in FIG. 6A.

Figure 6C:
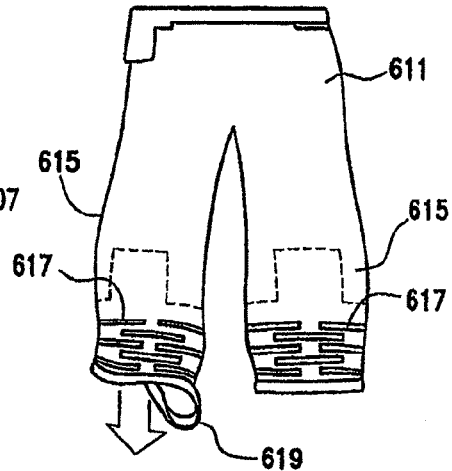
FIG. 6C is a first front elevational view of apparel, particularly a pair of pants bearing tracking marks according to another embodiment of the invention, the apparel being in a configuration to conceal the tracking marks.
Figure 6D:
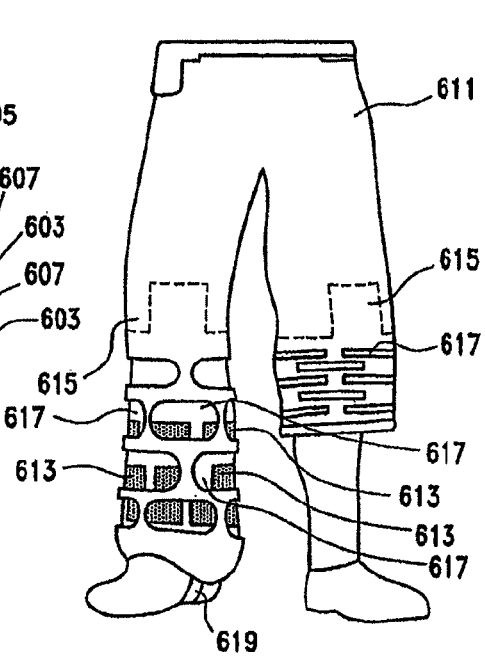
FIG. 6D is a second front elevational view of the apparel depicted in FIG. 6C, one leg portion of the apparel being in a configuration to expose the tracking marks.

Another type of apparel having the general structure of shirt 601 is depicted in FIGS. 6C and 6D as a pair of pants 611 that includes graphic marks 613. In the concealed configuration, which is depicted in FIG. 6C, two leg portions 615 are compressed and a plurality of apertures 617 defined in leg portions 615 are closed to conceal graphic marks 613. In FIG. 6D, however, one of leg portions 615 is expanded and placed in the exposed configuration, thereby exposing graphic marks 613. Each leg portion 615 includes a strap 619 that extends under the foot to retain pants 611 in the exposed configuration.

With reference to FIGS. 7A-7C, apparel that includes a shirt 701 and graphic marks 703 is disclosed. Shirt 701 includes sleeves 705 that are formed of two concentric layers of material. Adjacent to the wrist openings of sleeves 705, the outermost layer of material includes a plurality of parallel apertures 707. Graphic marks 703 have a cylindrical structure and are positioned between the layers of material forming sleeves 705. In the concealed configuration, as depicted in FIGS. 7A and 7B, graphic marks 703 are positioned in an elbow area of sleeves 705 and are not visible through apertures 707. In order to convert shirt 701 from the concealed configuration to the exposed configuration, the individual moves graphic marks 703 toward the wrist openings, thereby exposing graphic marks 703 through apertures 707, as depicted in FIG. 7C. Similarly, graphic marks 703 are moved away from apertures 707 to convert shirt 701 from the exposed configuration to the concealed configuration. The material forming shirt 701, and particularly sleeves 705, may be an elastic material that expands to open apertures 707 when graphic marks 703 are positioned adjacent apertures 707.

Apparel that includes pants 711 and graphic marks 713 is also disclosed in FIG. 7A. Pants 711 operate in a manner that is similar to shirt 701. Accordingly, graphic marks 713 are positioned between layers of material that form a pair of leg portions 715. In order to place pants 711 in the exposed configuration, graphic marks 713 are shifted downward and positioned behind a plurality of apertures 717 defined in leg portions 715.

Figure 8A:
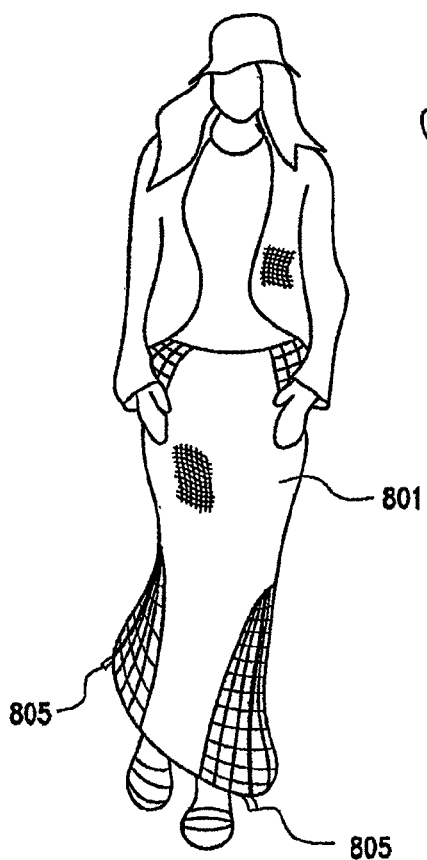
FIG. 8A is a front elevational view of apparel, particularly a dress bearing tracking marks according to another embodiment of the invention, the apparel being in a configuration to conceal the tracking marks.
Figure 8B:
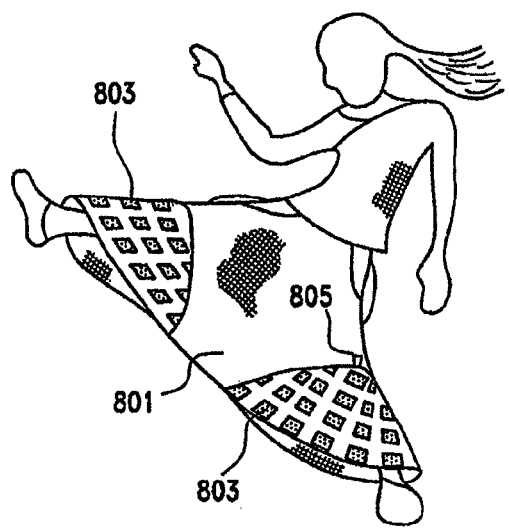
FIG. 8B is a perspective view of the apparel depicted in FIG. 8A, the apparel being in a configuration to expose the tracking marks.

Another type of apparel, particularly a dress 801 having graphic marks 803, is depicted in FIGS. 8A and 8B. In the concealed configuration, as depicted in FIG. 8A, a pair of zippers 805 that are located on opposite sides of dress 801 conceal additional material and graphic marks 803. In order to convert dress 801 from the concealed configuration to the exposed configuration, zippers 805 are opened, thereby exposing the additional material and graphic marks 803.

Another shirt 901 is depicted in FIGS. 9A-9E and includes a pair of detachable sleeves 903. Each of sleeves 903 includes a first surface 905 with properties, such as color, texture, and reflectivity, which are substantially similar to a remainder of shirt 901 and are not generally trackable by an interactive activity device. Each of sleeves 903 also include an opposite second surface 907 that includes graphic marks 909, which are trackable by an interactive activity device such as the interactive computer game 203. In the concealed configuration, which is depicted in FIGS. 9A and 9B, sleeves 903 form a wrist, forearm, and elbow portions of shirt 901, and first surface 905 faces outward. In order to convert shirt 901 from the concealed configuration to the exposed configuration, sleeves 905 are rolled downward toward the wrist opening, as depicted in FIGS. 9C and 9D, thereby exposing second surface 907 and graphic marks 909. In the exposed configuration, therefore, each of sleeves 903 are rolled toward the wrist opening such that graphic marks 909 face outward, as depicted in FIG. 9E.

Shirt 901 generally operates to convert from the concealed configuration to the exposed configuration by reversing the surfaces of sleeves 905 that are exposed. Apparel operating in a similar manner is depicted in FIGS. 10A-10E and includes a shirt 1001 and graphic marks 1003. Shirt 1001 includes a pair of cuff areas 1005 associated with each sleeve. Each cuff area 1005 includes overlapping sections of material and fasteners 1007 that secure the overlapping sections together. Fasteners 1007 may have the configuration of snaps, buttons, a hook and loop fastener, or a magnetic fastening system, for example. Referring to FIGS. 10A and 1013, shirt 1001 is depicted in the concealed configuration and cuff areas 1005 exhibit a substantially conventional appearance that hides graphic marks 1003. Cuff areas 1005 have a first surface that faces outward when shirt 1001 is in the concealed configuration. In order to convert shirt 1001 from the concealed configuration to the exposed configuration, fasteners 1007 and the overlapping sections of material are separated, as depicted in FIGS. 10C and 10D. Cuff areas 1005 are then folded backwards to expose graphic marks 1003, which are positioned on a second surface that is opposite the first surface, and fasteners 1007 are resecured to place shirt 1001 in the exposed configuration depicted in FIG. 10E The reverse procedure may be employed to convert shirt 1001 from the exposed configuration to the concealed configuration.

Shirt 1001 also includes a flap 1009 positioned in a torso area. A first surface of flap 1009 has properties that are similar to other portions of shirt 1001, but a second surface of flap 1009 includes a graphic mark 1011 that is trackable by an interactive activity device. In order to convert shirt 1001 from the concealed configuration to the exposed configuration, flap 1009 is folded backward and graphic mark 1011 is exposed. Fasteners that are similar to fasteners 1007 may be utilized to secure the position of flap 1009 in either the concealed configuration or the exposed configuration.

Figure 11A:
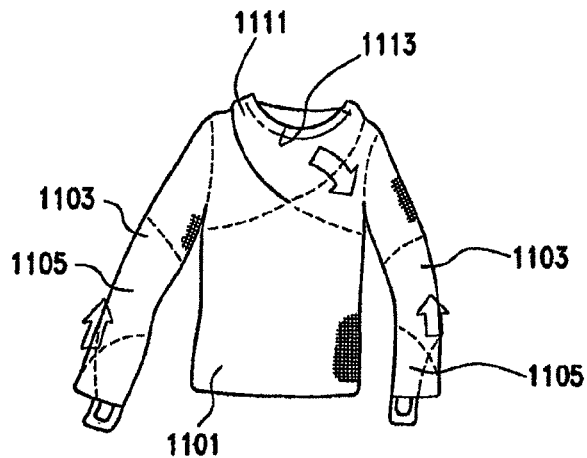
FIG. 11A is a front elevational view of apparel, particularly a shirt bearing tracking marks according to yet another embodiment of the invention, the apparel being in a configuration to conceal the tracking marks.
Figure 11B:
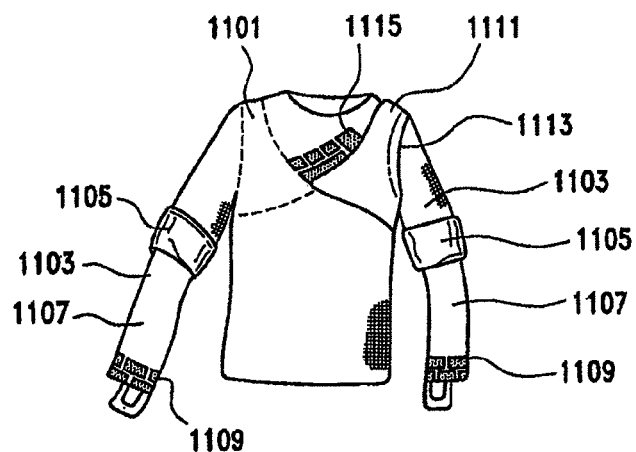
FIG. 11B is a front elevational view of the apparel depicted in FIG. 11A, the apparel being in a configuration to expose the tracking marks.

A shirt 1101 is depicted in FIGS. 11A and 1B and has a pair of sleeves 1103 that are formed of at least two concentric layers of material. Each sleeve 1103 thus includes an outer layer 1105 that extends over an inner layer 1107. In the concealed configuration, depicted in FIG. 11A, outer layer 1105 covers inner layer 1107 and conceals graphic marks 1109 that are positioned on inner layer 1107. In order to convert shirt 1103 to the exposed configuration, depicted in FIG. 11B, outer layer 1105 is rolled or folded toward an elbow area of sleeves 1103, thereby exposing inner layer 1107 and graphic marks 1109. Furthermore, each inner layer 1107 may include a thumb aperture that extends over the thumb and secures the position of inner layer 1107 and graphic marks 1109 with respect to the hand.

Shirt 1101 also includes a flap 1111 located in a torso area of shirt 1101 and having an aperture 1113. Flap 1111 covers another graphic mark 1115 that is positioned on the torso area of shirt 1101. In the concealed configuration, flap 1111 covers graphic mark 1115 and the player's head extends through aperture 1113. A magnetic fastener located adjacent aperture 1113 and on a shoulder area of shirt 1101 may be utilized to secure the position of flap 1111 in the concealed configuration. In the exposed configuration, however, flap 1111 is pulled over the head, and the player's right arm is positioned through aperture 1113, thereby exposing graphic mark 1115.

Figure 12A:
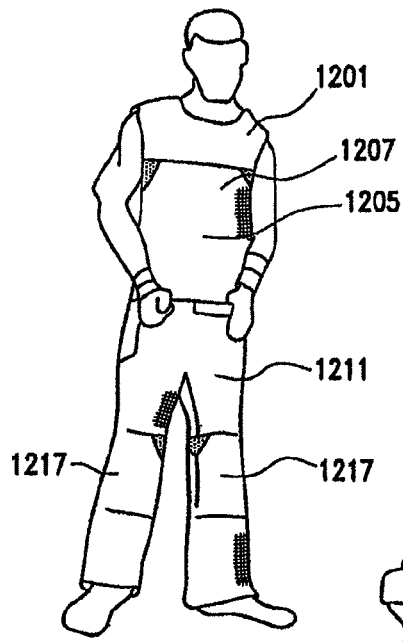
FIG. 12A is a front elevational view of two types of apparel, particularly a shirt bearing tracking marks and a pair of pants bearing tracking marks according to yet other embodiments of the invention, the two types of apparel being in a configuration to conceal the tracking marks.
Figure 12B:
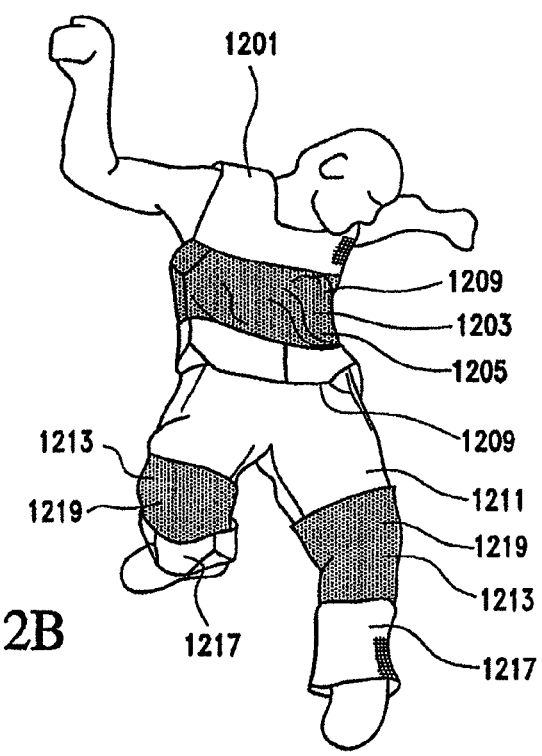
FIG. 12B is a front elevational view of the two types of apparel depicted in FIG. 12A, the two types of apparel being in a configuration to expose the tracking marks.

In converting shirt 1101 from the concealed configuration to the exposed configuration the general operation includes rolling or folding material to expose graphic marks 1109. A similar operation may be utilized in other apparel types, including a shirt 1201 and a pair of pants 1211 that are depicted in FIGS. 12A and 12B. A graphic mark 1203 is positioned on a torso area 1205 of shirt 1201. Torso area 1205 includes an outer layer 1207 and an inner layer 1209 that are concentrically arranged. In the concealed configuration, outer layer 1207 extends over inner layer 1209 and covers graphic mark 1203. Shirt 1201 is converted from the concealed configuration to the exposed configuration by folding outer layer 1207 downward, thereby exposing inner layer 1209 and graphic mark 1203. Pants 1211 operate in a manner that is similar to shirt 1201. In general, graphic marks 1213, which are located in the leg areas of pants 1211, are exposed by folding outer layers 1217 away from the inner layers 1219 (which each include one of graphic marks 1213).

Figure 13A:
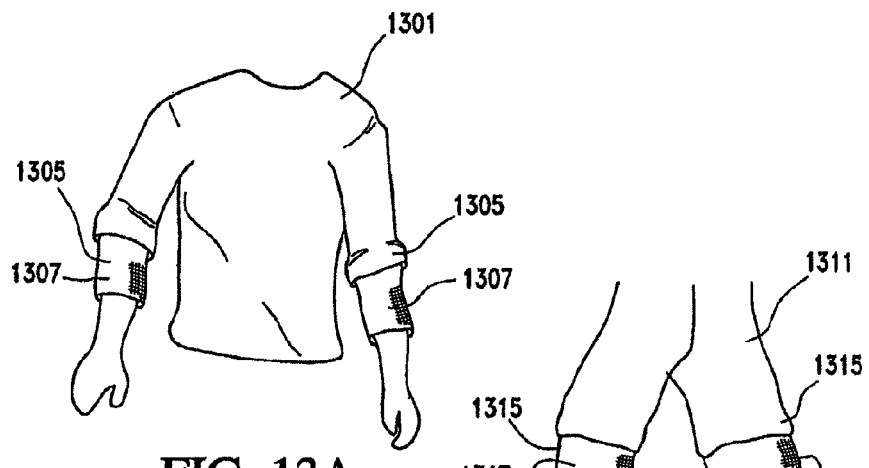
FIG. 13A is a first front elevational view of apparel, particularly a shirt bearing tracking marks according to yet another embodiment of the invention, the apparel being in a configuration to conceal the tracking marks.
Figure 13C:
FIG. 13C is a first front elevational view of apparel, particularly a pair of pants bearing tracking marks according to another embodiment of the invention, the apparel being in a configuration to conceal the tracking marks.
Figure 13B:
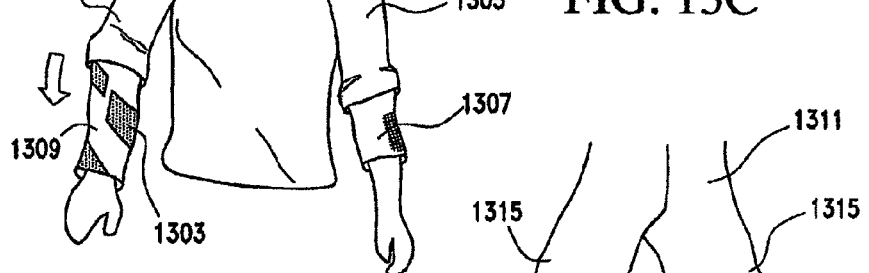
FIG. 13B is a second front elevational view of the apparel depicted in FIG. 13A, one sleeve of the apparel being in a configuration to expose the tracking marks.

Another apparel structure is depicted in FIGS. 13A and 13B and includes a shirt 1301 and graphic marks 1303. Shirt 301 includes a pair of sleeves 1305, where each sleeve has a first surface 1307 and a second surface 1309. In the concealed configuration, lower sleeves 1305 are folded such that first surface 1307 faces outward and first surface 1307 forms a surface that contacts the arm of the individual. In effect, therefore, each sleeve 1305 is fashioned from a folded element of material that forms two concentric layers, and graphic mark 1303 is located on second surface 1309, which is folded back upon itself in the concealed configuration. In order to convert shirt 1301 from the concealed configuration to the exposed configuration, sleeves 1305 are merely unfolded such that first surfaces 1307 lie adjacent to the arms and second surfaces 1309 face outward, thereby exposing graphic mark 1303.

Figure 13D:
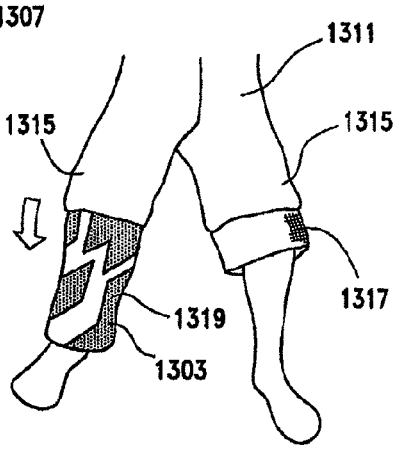
FIG. 13D is a second front elevational view of the apparel depicted in FIG. 13C, one leg portion of the apparel being in a configuration to expose the tracking marks.

Apparel having a pair of pants 1311 and graphic marks 1313 is depicted in FIGS. 13C and 13D. In a manner that is similar to shirt 1301, pants 1311 have leg portions 1315 that each has a first surface 1317 and a second surface 1319. Referring to FIG. 13C, which depicts the concealed configuration, leg portions 1315 are folded such that only first surface 1317 is visible. In FIG. 13D, however, one of leg portions 1315 is unfolded such that first surface 1317 lies adjacent to the leg and second surface 1319, which includes one of graphic marks 1313, faces outward. Accordingly, pants 1311 may be converted from the concealed configuration to the exposed configuration by merely unfolding leg portions 1313. Similarly, pants 1311 may be converted from the exposed configuration to the concealed configuration by merely refolding leg portions 1313.

Figure 14A:
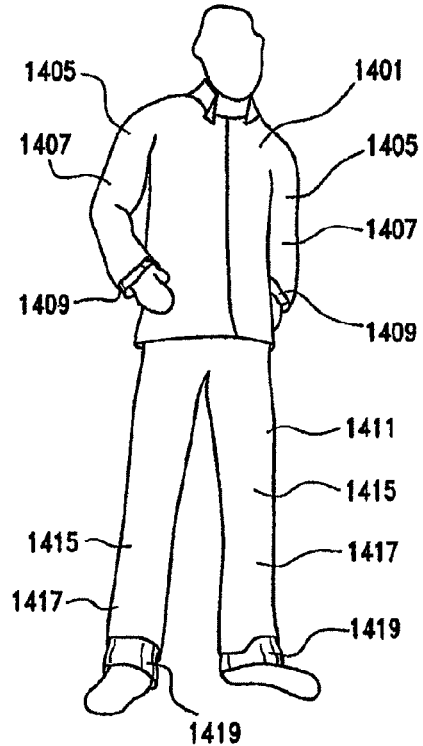
FIG. 14A is a perspective view of two types of apparel, particularly a shirt bearing tracking marks and a pair of pants bearing tracking marks according to yet another embodiment of the invention.
Figure 14B:
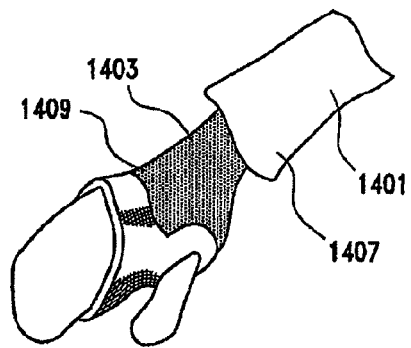
FIG. 14B is a partial perspective view of a sleeve of the apparel depicted in FIG. 14A, the sleeve being in a configuration to expose the tracking marks.

Another general procedure by which apparel may be converted from the concealed configuration to the exposed configuration relates to stretching the apparel in a manner that exposes the graphic marks. For example, apparel having a shirt 1401 and graphic marks 1403 is depicted in FIGS. 14A and 14B. Shirt 1401 includes two sleeves 1405 that are generally formed of two concentric layers of material, an exterior layer 1407 and an interior layer 1409. Exterior layer 1407 generally extends over interior layer 1409 and is formed of a material that is generally not detectable by interactive computer game 203. A first portion of interior layer 1409 extends out of exterior layer 1407 and forms a cuff of shirt 1401. Graphic marks 1403, however, are positioned on a second portion of interior layer 1409 that is concealed by exterior layer 1407 when shirt 1401 is in the concealed configuration, as depicted in FIG. 14A. In order to convert shirt 1401 from the concealed configuration to the exposed configuration, interior layer 1409 is stretched outward, as depicted in FIG. 14B, thereby extending the second portion of interior layer 1409 out of exterior layer 1407 and exposing graphic marks 1403. The area of interior layer 1409 that forms the cuff includes an aperture that may be placed around the thumb to prevent interior layer 1409 from contracting and extending back into exterior layer 1407. Accordingly, stretching interior layer 1407 converts shirt 1401 from the concealed configuration to the exposed configuration.

Figure 14C:
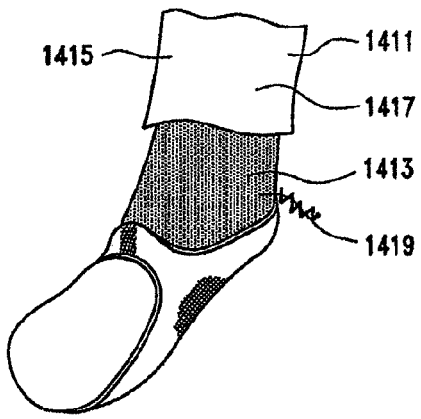
FIG. 14C is a partial perspective view of a leg portion of the apparel depicted in FIG. 14A, the leg portion being in a configuration to expose the tracking marks.

FIGS. 14A and 14C both depict a pair of pants 1411 and graphic marks 1413 with a similar structure. Pants 1411 have leg portions 1415 that are each formed of an exterior layer 1417 and an interior layer 1419. Graphic marks 1413 are positioned on interior layers 1419. As depicted in FIG. 14A, pants 1411 are in a concealed configuration and graphic marks 1413 are not exposed. In order to convert pants 1411 from the concealed configuration to the exposed configuration, interior layers 1419 are stretched outward and graphic marks 1413 are exposed, as depicted in FIG. 14C. A portion of interior layer 1419 may be placed around the foot to retain pants 1411 in the exposed configuration.

Figures 15A, 15B, 15C:
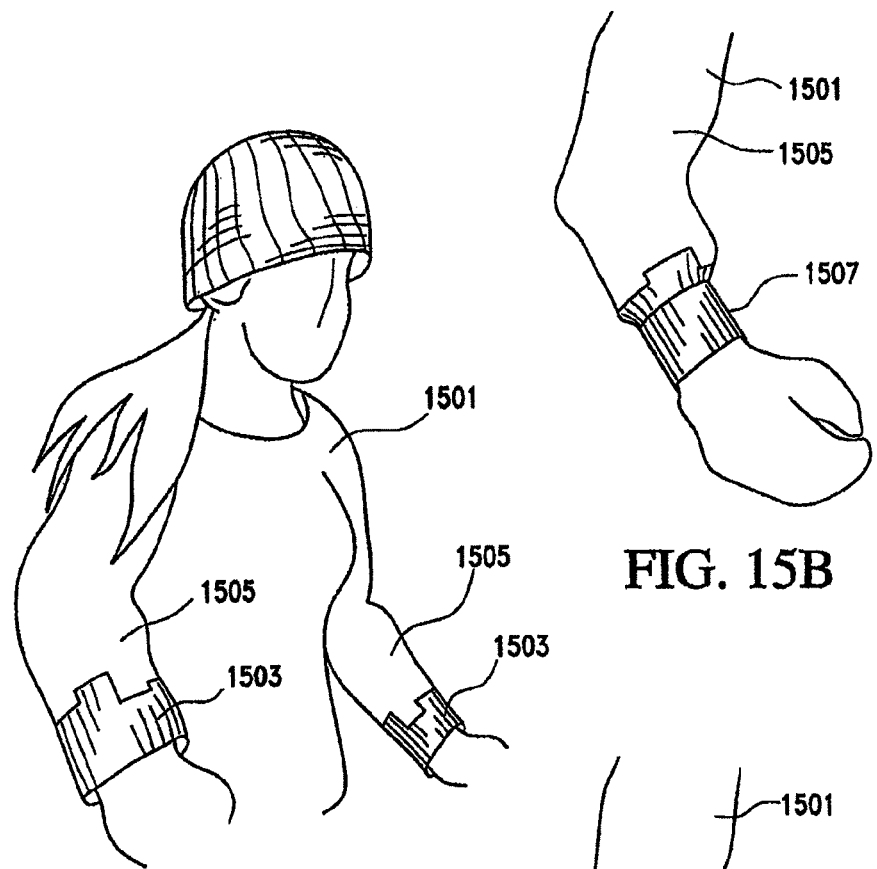
FIG. 15A is a front elevational view of apparel, particularly a shirt bearing tracking marks according to yet another embodiment of the invention.
FIG. 15B is a first partial perspective view of a sleeve of the apparel depicted in FIG. 15A, the apparel being in a configuration to conceal the tracking marks.
FIG. 15C is a second partial perspective view of the sleeve of the apparel depicted in FIG. 15A, the apparel being in a configuration to expose the tracking marks.

Another embodiment wherein a portion of apparel, which includes a shirt 1501 and graphic marks 1503, is stretched to expose graphic marks 1503 is depicted in FIGS. 15A-15C. Shirt 1501 includes a pair of sleeves 1505 that have cuffs 1507. Each cuff 1507 is formed of a knitted or elastic material that has a ribbed structure. When cuffs 1507 extend around wrists of the individual, as depicted in FIGS. 15A and 15B, cuffs 1507 have a substantially conventional appearance and tracking, marks 1503 are concealed. When cuffs 1507 are stretched over the hands, however, the various ribs in cuffs 1507 separate to reveal graphic marks 1503, as depicted in FIG. 15C.

FIGS. 16A-16C disclose apparel having a shirt 1601 and graphic marks 1603. In the concealed configuration, which is depicted in FIG. 16A, shirt 1601 has the general structure of a vest that includes a hood 1605. In order to convert shirt 1601 from the concealed configuration to the exposed configuration, hood 1605 is unzipped along a zipper line 1607 to reveal a pair of sleeves 1609 that include the graphic marks 1603, as depicted in FIG. 16B. In addition, graphic marks 1603 are positioned on other interior portions of hood 1605, which extend around the back of the individual when shirt 1601 is in the exposed configuration, as depicted in FIG. 16C.

The above descriptions of apparel, which were disclosed with reference to FIGS. 3A-16C, provide various examples of shirts and pants that may be utilized to selectively conceal and expose graphic marks. In some embodiments, a structure for concealing and exposing graphic marks was disclosed with respect to a shirt, for example. One skilled in the relevant art will recognize that a similar structure may also be applied to other types of apparel, such as pants, a coat, shoes, or sock, for example. Accordingly, the various structures for concealing and exposing graphic marks are disclosed with respect to a specific type of apparel to merely provide an example of the manner in which the structures may be incorporated into apparel, and are not intended to limit the various embodiments of the invention to any specific type of apparel. Furthermore, the above discussions generally provide instructions regarding the manner in which apparel is converted from the concealed configuration to the exposed configuration. One skilled in the relevant art will recognize that a reverse process may be employed to convert the apparel from the exposed configuration to the concealed configuration.

Some applications for interactive activity devices may require that the position of the feet, rather than the position of the ankles or legs, be detected. For example, an interactive activity device that simulates the game of soccer may include game play that involves kicking a soccer ball. Accordingly, apparel in the form of footwear, which includes shoes and socks, may be utilized in conjunction with graphic marks to provide an interactive activity device with accurate data concerning the position of the feet.

Figure 17A:
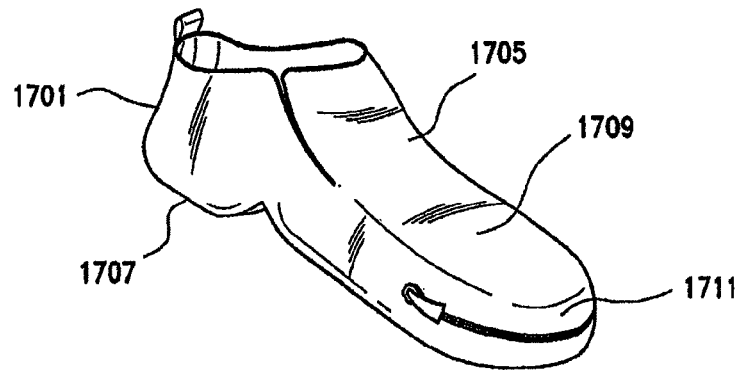
FIG. 17A is a perspective view of apparel, particularly a shoe bearing tracking marks according to yet another embodiment of the invention, the apparel being in a configuration to conceal the tracking marks.
Figure 17B:
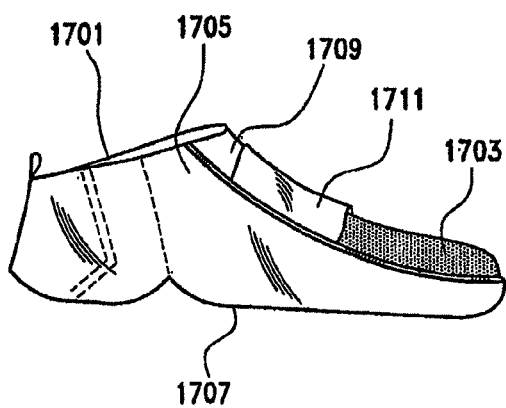
FIG. 17B is a side elevational view of the apparel depicted in FIG. 17A, the apparel being in a configuration to expose the tracking marks.

A shoe 1701 having a graphic mark 1703 is depicted in FIGS. 17A and 17B. Shoe 1701 includes an upper 1705 and a sole 1707. Upper 1705 is configured to comfortably and securely receive a foot, thereby fastening shoe 1701 to the foot. Sole 1707 is attached to a lower portion of upper 1705 and may include two primary elements, a midsole and an outsole. The midsole attenuates ground reaction forces and absorbs energy to cushion the foot and leg from impact with the ground. The outsole is a wear resistant element for engaging the ground and providing traction. In general, therefore, shoe 1701 has the configuration of a conventional shoe, such as a running shoe or cross training shoe that, for example, is utilized for athletic activities.

Upper 1705 includes an instep area 1709 that corresponds with the instep portion of the foot. In other words, instep area 1709 extends along the top surface of upper 1705 from the toe region to the ankle opening. The material forming upper 1705 in instep area 1709 forms a flap 1711 that may be utilized to selectively conceal or expose graphic mark 1703. With reference to FIG. 17A, shoe 1701 is depicted in the concealed configuration, wherein flap 1711 extends over graphic mark 1703. When the individual intends to expose graphic mark 1703, however, flap 1711 may be pulled toward the ankle opening and secured in position with a magnetic fastener or a hook and loop fastener, for example. Accordingly, shoe 1701 may be placed in the exposed configuration by removing flap 1711 from the area of graphic mark 1703, as depicted in FIG. 17B. Similarly, shoe 1701 may be returned to the concealed configuration by replacing the position of flap 1711.

The specific position of graphic mark 1703 may vary within the scope of the invention. In one embodiment, graphic mark 1703 may be positioned exclusively on the portion of upper 1705 that is covered by flap 1711. Pulling back flap 1711 will operate, therefore, to expose a second layer of upper 1705 that includes graphic mark 1703. In another embodiment, however, graphic mark 1703 may be positioned on the underside of flap 1711 and on the portion of upper 1705 that is covered by flap 1711. Pulling back flap 1711 will operate, therefore, to reveal the presence of graphic mark 1703 on both the second layer of upper 1705 and on the underside of flap 1711. In still further embodiments of the invention, flap 1711 may be located in other areas of shoe 1701, such as the heel area, the medial side, or the lateral side, for example.

Figure 18A:
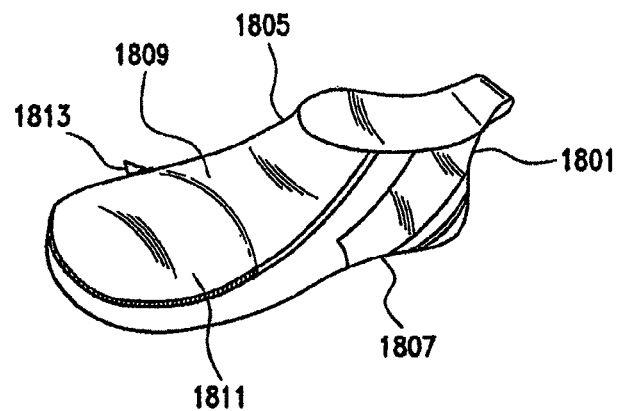
FIG. 18A is a first perspective view of apparel, particularly a shoe bearing tracking marks according to another embodiment of the invention, the apparel being in a configuration to conceal the tracking marks.
Figure 18B:
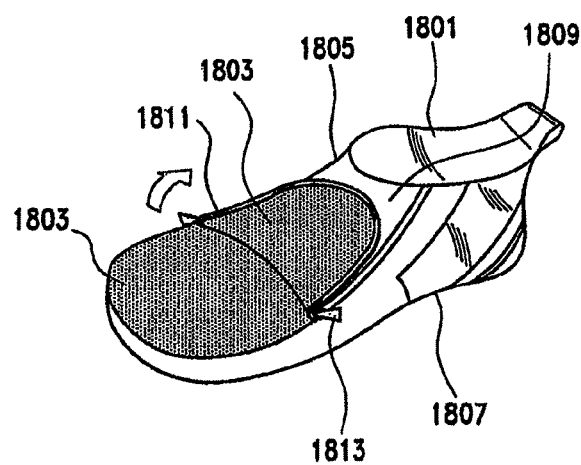
FIG. 18B is a second perspective view of the apparel depicted in FIG. 18A, the apparel being in a configuration to expose the tracking marks.

A shoe 1801 and graphic mark 1803 having a structure that is similar to shoe 1701 and graphic mark 1703 is depicted in FIGS. 18A and 18B. Shoe 1801 includes an upper 1805 and a sole 1807. Upper 1805 has an instep area 1809 that defines a flap 1811 for selectively covering and exposing graphic mark 1803. Whereas flap 1711 loosely covered instep area 1705 in the concealed configuration, flap 1811 includes a zipper 1813 that secures the position of flap 1811 over graphic mark 1803. Furthermore, shoe 1801 is depicted as including a portion of graphic mark 1803 on the underside of flap 1811.

Figure 19A:
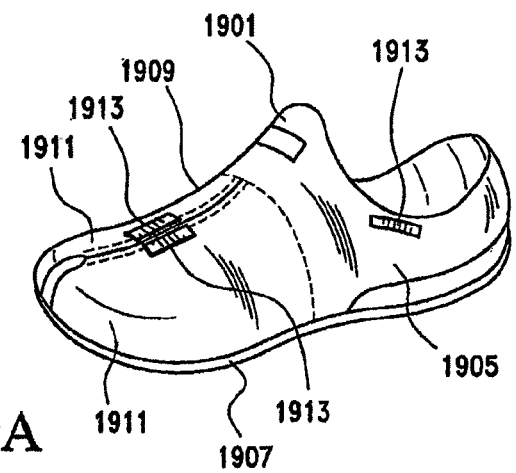
FIG. 19A is a first perspective view of apparel, particularly a shoe bearing tracking marks according to yet another embodiment of the invention, the apparel being in a configuration to conceal the tracking marks.
Figure 19B:
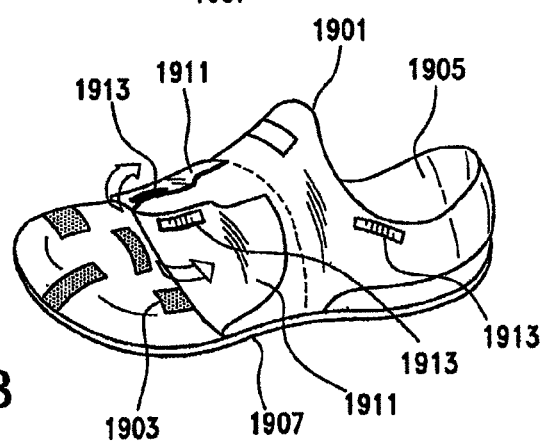
FIG. 19B is a second perspective view of the apparel depicted in FIG. 19A.
Figure 19C:
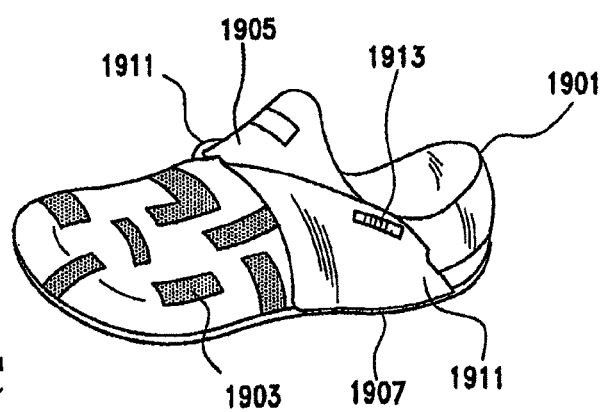
FIG. 19C is a third perspective view of the apparel depicted in FIG. 19A, the apparel being in a configuration to expose the tracking marks.

Another shoe 1901 and graphic mark 1903 is depicted in FIGS. 19A-19C. Shoe 1901 includes an upper 1905 and a sole 1907. Upper 1905 includes an instep area 1909 with a pair of flaps 1911 that may be folded back to reveal graphic mark 1703 on instep area 1909. Referring to FIG. 19A, shoe 1901 is depicted in the concealed configuration, wherein flaps 1911 extend over graphic mark 1903 and generally prevent graphic mark 1903 from being detected by an interactive activity device. In order to convert shoe 1901 to the exposed configuration, however, flaps 1911 are folded backwards, as depicted in FIGS. 19B and 19C.

A magnetic fastener 1913, for example, may be utilized to secure the position of flaps 1911 in both the concealed and exposed configuration. A portion of magnetic fastener 1913 is depicted as being located on both of flaps 1911, and a corresponding portion of magnetic fastener is depicted as being located adjacent the ankle opening of shoe 1901. When shoe 1901 is in the concealed configuration, the portions of magnetic fastener 1913 that are located on flaps 1911 may attract each other to secure to position of flaps 1911 over graphic mark 1903. When shoe 1901 is in the exposed configuration, however, the portions of magnetic fastener 1913 that are located on flaps 1911 may attract the corresponding portions that are adjacent the ankle opening, thereby securing flaps 1911 in the exposed configuration.

Figure 20A:
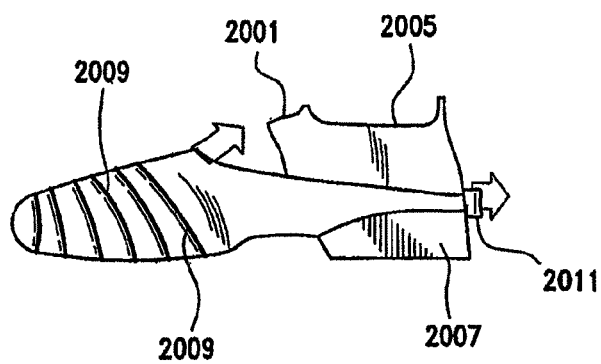
FIG. 20A is a first side elevational view of apparel, particularly a shoe bearing tracking marks according to another embodiment of the invention, the apparel being in a configuration to conceal the tracking marks.
Figure 20B:
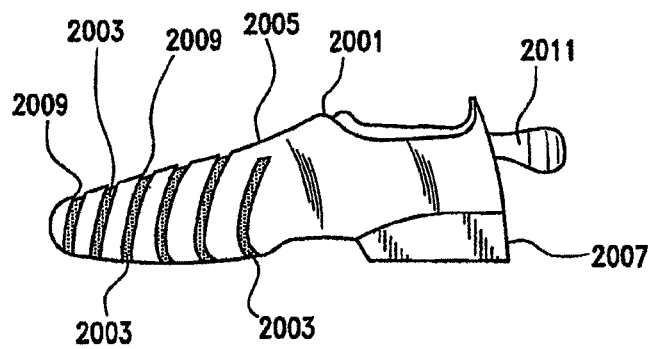
FIG. 20B is a second side elevational view of the apparel depicted in FIG. 20A, the apparel being in a configuration to expose the tracking marks.

Another shoe 2001 and various graphic marks 2003 are depicted in FIGS. 20A-20B. Shoe 2001 includes an upper 2005 and a sole 2007. Upper 2005 includes a plurality of slits 2009 that are mechanically coupled to a drawstring 2011 extending from a heel area of shoe 2001. Graphic marks 2003 are positioned behind slits 2009. In the concealed configuration, edges of slits 2009 contact each other and conceal graphic marks 2003, as depicted in FIG. 20A. In order to convert shoe 2001 from the concealed configuration to the exposed configuration, a portion of drawstring 2011 is drawn out of the heel area. This action operates to separate the edges of slits 2009, thereby revealing graphic marks 2003, as depicted in FIG. 20B. Accordingly, graphic marks 2003 may be revealed by through manipulating the position of drawstring 2011.

Figure 21A:
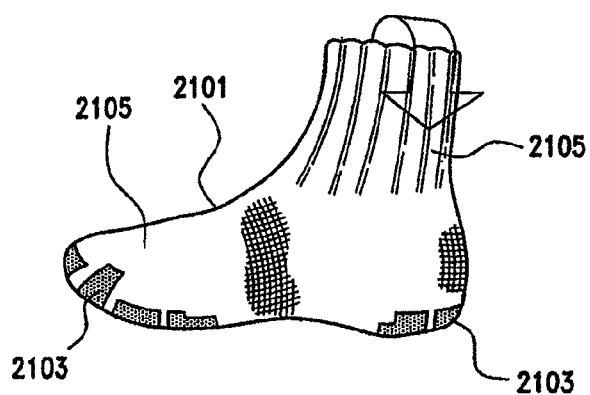
FIG. 21A is a first side elevational view of apparel, particularly a sock bearing tracking marks according to another embodiment of the invention, the apparel being in a configuration to conceal the tracking marks.
Figure 21B:
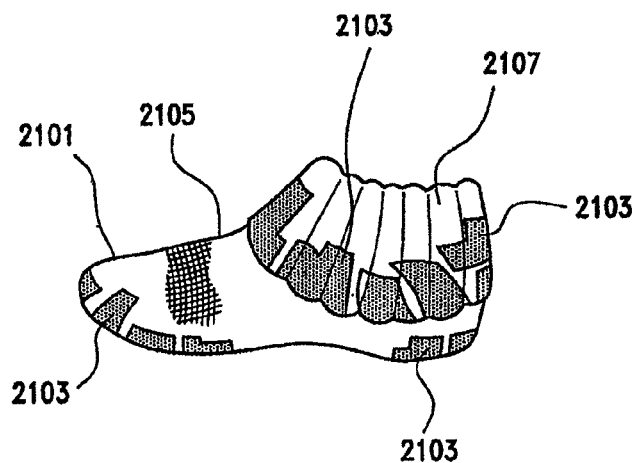
FIG. 21B is a second side elevational view of the apparel depicted in FIG. 21A, the apparel being in a configuration to expose the tracking marks.

In addition to shoes, socks may be utilized in connection with graphic marks to provide interactive computer game 203 with data concerning the position of the feet. Referring to FIGS. 21A and 21B, a sock 2101 and graphic marks 2103 are depicted. Sock 2101 includes an exterior surface 2105 that faces away from the foot, and sock 2101 includes an interior surface 2107 that generally contacts the foot. Graphic marks 2103 are positioned on an ankle area of interior surface 2107. In the concealed configuration, which is depicted in FIG. 21A, the ankle area extends along the ankle such that graphic marks 2103 are adjacent the ankle and are concealed from view. In order to convert sock 2101 from the concealed configuration to the exposed configuration, the ankle area may be folded downward, as depicted in FIG. 21B, such that the ankle area is effectively turned outward to expose graphic marks 2103. In some embodiments of the invention, graphic marks 2103 may also be positioned on exterior surface 2105 such that wearing a shoe will provide effective concealment.

Figure 22A:
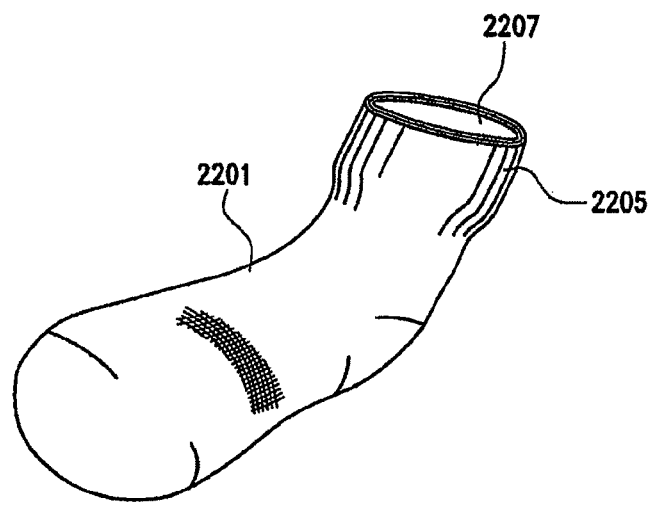
FIG. 22A is a first perspective view of apparel, particularly a sock bearing tracking marks according to yet another embodiment of the invention, the apparel being in a configuration to conceal the tracking marks.
Figure 22B:
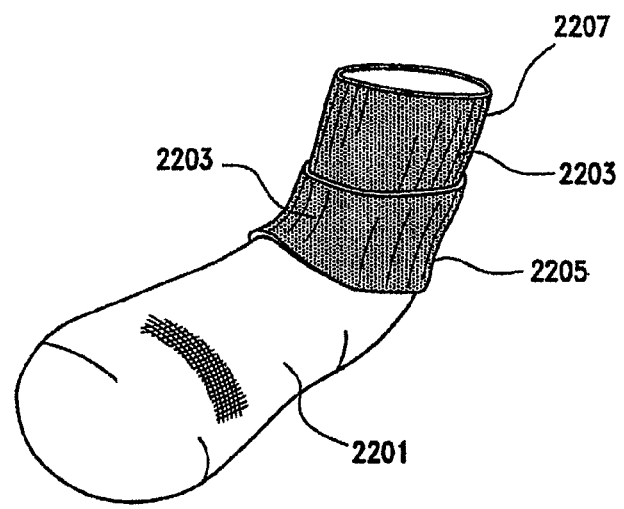
FIG. 22B is a second perspective view of the apparel depicted in FIG. 22A, the apparel being in a configuration to expose the tracking marks.

Another sock 2201 and graphic mark 2203 is depicted in FIGS. 22A and 22B. Sock 2201 includes an ankle area that has an exterior layer 2205 and an inner layer 2207 that are arranged in a concentric mariner. Graphic mark 2203 is positioned on adjacent surfaces of exterior layer 2205 and interior layer 2207. In the concealed configuration, as depicted in FIG. 22A, layers 2205 and 2207 extend upward along the ankle and effectively conceal graphic marks 2203. In order to convert sock 2201 to the exposed configuration, exterior layer 2205 is folded downward, as depicted in FIG. 22B.

Whereas footwear bearing graphic marks may be utilized to provide data concerning the position of the feet, some applications of an interactive activity device may require that the position of the head be detected. For example, an interactive activity device that simulates the game of soccer may include game play that involves utilizing the head to direct the motion of a soccer ball. Accordingly, apparel in the form of headwear, such as a hat or headband, may be utilized in conjunction with graphic marks to provide the interactive activity device with accurate data concerning the position of the head.

Figure 23A:
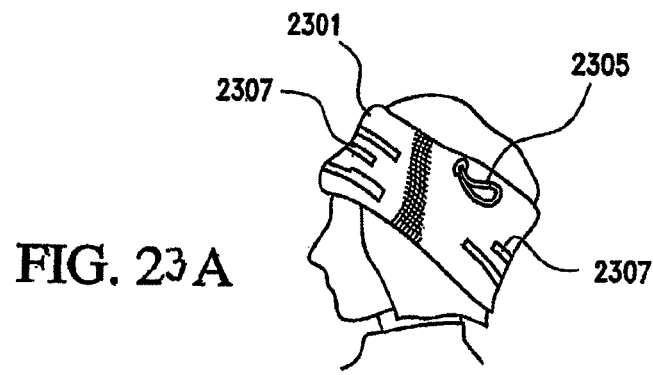
FIG. 23A is a first side elevational view of apparel, particularly a hat bearing tracking marks according to yet another embodiment of the invention, the apparel being in a configuration to conceal the tracking marks.
Figure 23B:
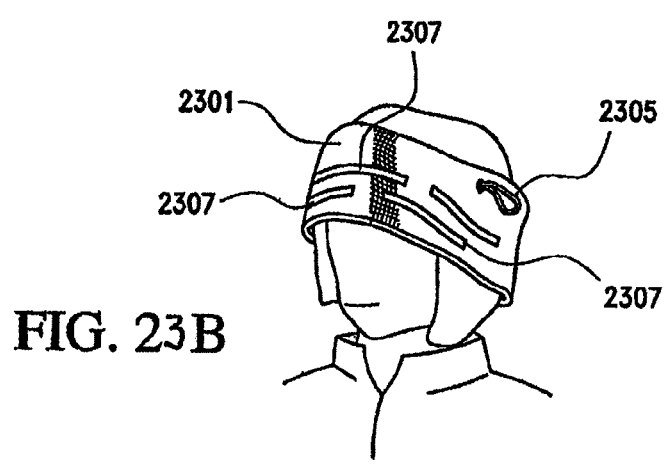
FIG. 23B is a perspective view of the apparel depicted in FIG. 23A, the apparel being in the configuration to conceal the tracking marks.
Figure 23C:
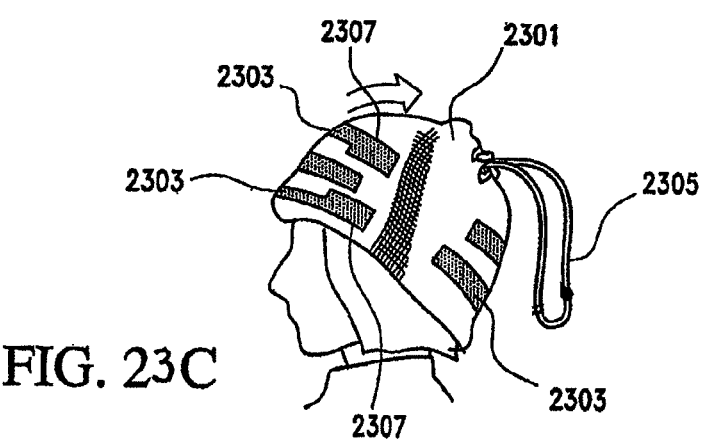
FIG. 23C is a second side elevational view of the apparel depicted in FIG. 23A, the apparel being in a configuration to expose the tracking marks.

A hat 2301 and various graphic marks 2303 are disclosed in FIGS. 23A-23C. Hat 2301 has a generally cylindrical structure and includes a drawstring 2305 that extends around the head. In the concealed configuration, as depicted in FIGS. 23A and 23B, hat 2301 exposes the top of the head and includes a plurality of slits 2307 that are closed to conceal graphic marks 2303. In order to convert hat 2301 to the exposed configuration, drawstring 2305 is tightened such that hat 2301 stretches to the top of the head. The stretching of hat 2301 causes slits 2307 to separate and exposes graphic marks 2303, as depicted in FIG. 23C.

Figure 24A:
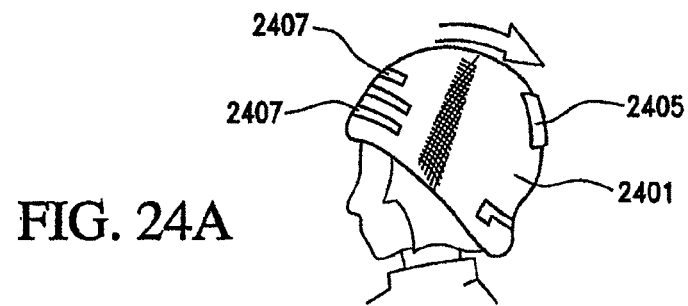
FIG. 24A is a first side elevational view of apparel, particularly a hat bearing tracking marks according to yet another embodiment of the invention, the apparel being in a configuration to conceal the tracking marks.
Figure 24B:
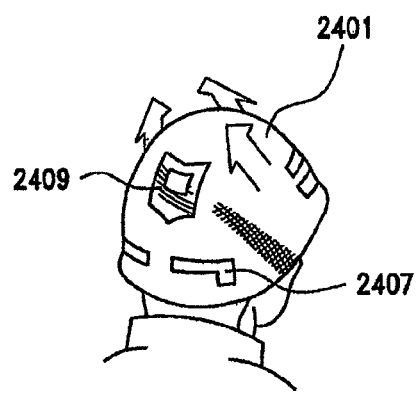
FIG. 24B is a perspective view of the apparel depicted in FIG. 24A, the apparel being in the configuration to conceal the tracking marks.
Figure 24C:
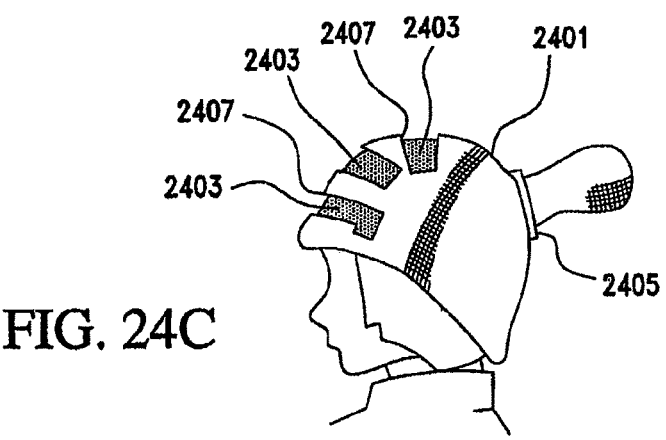
FIG. 24C is a second side elevational view of the apparel depicted in FIG. 24A, the apparel being in configuration to expose the tracking marks.

Another hat 2401 and various graphic marks 2403 are depicted in FIGS. 24A-24C. Hat 2401 includes an element 2405 that is positioned in an area that corresponds with a rear portion of the head. In the concealed configuration, which is depicted in FIGS. 24A and 24B, a plurality of slits 2407 are in a closed configuration and conceal graphic marks 2403. In order to convert hat 2401 to the exposed configuration, portions of hat 2401 are drawn through element 2405 so as to stretch hat 2401 over the head, as depicted in FIG. 24C. The stretching of hat 2401 acts to separate slits 2407 and expose graphic marks 2403.

Additional examples of embodiments for shirts and pants will now be discussed. Referring to FIGS. 25A-25D a pair of pants 2501 and graphic marks 2503 are disclosed. Pants 2501 include a pair of leg portions 2505, with each leg portion 2505 having a pair of independent V-shaped straps 2507 that form an X-shaped structure. Each strap 2507 is secured to pants 2501 with a releasable fastener, such as a hook and loop fastener. In the concealed configuration, which is depicted in FIGS. 25A and 25B, straps 2507 are positioned on a back area of leg portions 2505, and graphic marks 2503 concealed by straps 2507. More particularly, graphic marks are positioned on the areas of straps 2507 that are concealed, and graphic marks 2503 are positioned on the areas of leg portions 2505 that are under straps 2507. In order to convert pants 2501 from the concealed configuration to the exposed configuration, straps 2507 are detached and extended around to a front area of leg portions 2505, as depicted in FIG. 25C. This action exposes the area of straps 2507 were previously adjacent to leg portions 2505, thereby exposing graphic marks 2503, as depicted in FIG. 25D.

A similar structure may be applied to other apparel, such as a shirt 2511 and graphic marks 2513, which are disclosed in FIGS. 25E-25G. Shirt 2511 includes two sleeves 2515 that each has two V-shaped straps 2517. The concealed configuration of shirt 2511 is depicted in FIGS. 25E and 25F. Straps 2517 may be detached from a back area of shirt 2511, wrapped around sleeves 2515, and subsequently reattached to a front area of shirt 2511, thereby exposing graphic marks 2513 and placing shirt 2511 in the exposed configuration, as depicted by FIG. 25G.

Apparel having a woven structure is depicted in FIGS. 26A-26C and includes a shirt 2601 and graphic marks 2603. Shirt 2601 includes two sleeves 2605 that are woven in a manner that incorporates an element 2607, which is woven into the structure of sleeves 2605 and includes graphic marks 2603. In operation, elements 2607 translate bi-directionally through a distance that is approximately equal to one line of weaving.

Accordingly, the process of moving or translating elements 2607 exposes areas of elements 2607 that were previously positioned under other portions of sleeves 2605. In the concealed configuration, which is depicted in FIGS. 26A and 26B, elements 2607 are in a first position and graphic marks 2603 are concealed. In order to convert shirt 2601 to the exposed configuration, elements 2607 are moved relative to sleeves 2605 and the portions of elements 2607 that include graphic marks 2603 are exposed. A similar configuration may also be utilized in a pair of pants 2611 having other graphic marks, which is also depicted in FIG. 26A.

Many applications of an interactive activity device will require data concerning the positions of the extremities, which include the arms and legs, in order to effectively track the movements of the individual. The various types of apparel discussed above, including the shirts, pants, and footwear, may be utilized to provide an interactive activity device with data concerning the positions of the extremities. Some individuals, however, may prefer to utilize a band structure, such as a wristband or ankleband, which bears graphic marks. The following discussion provides example of various bands that are discussed with reference to either the wrist or the ankle for purposes of illustration. One skilled in the relevant art will recognize, however, the general structure of the bands discussed herein are not limited to wrist and ankle applications, but may be applied to other areas of the body, including the elbows, knees, and upper arms, for example.

Figure 27A:
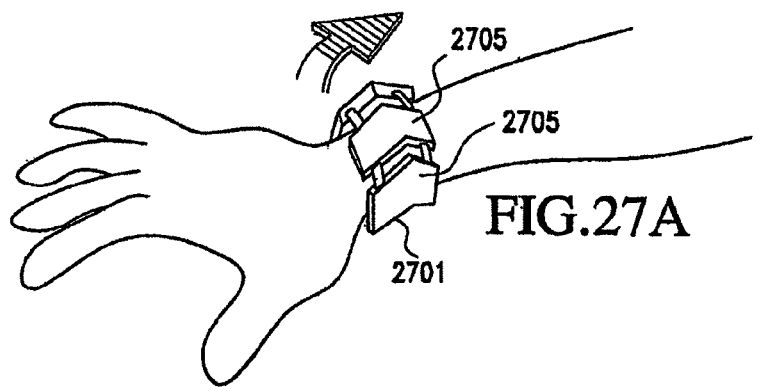
FIG. 27A is a first perspective view of apparel, particularly a band bearing tracking marks according to yet another embodiment of the invention, the apparel being in a configuration to conceal the tracking marks.
Figure 27B:
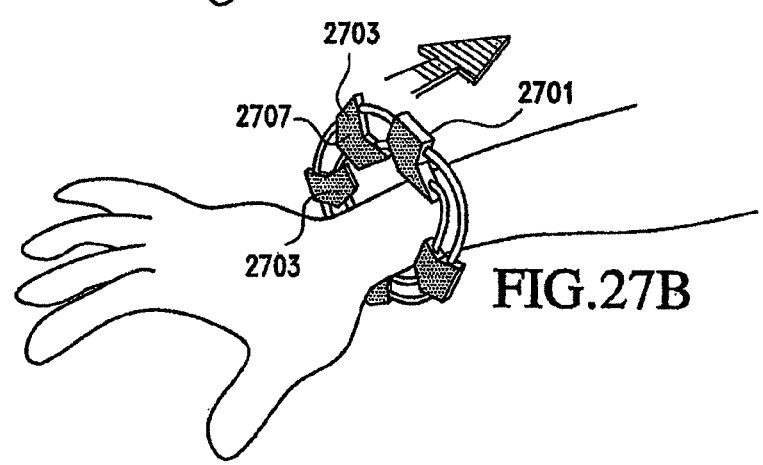
FIG. 27B is a second perspective view of the apparel depicted in FIG. 27A.
Figure 27C:
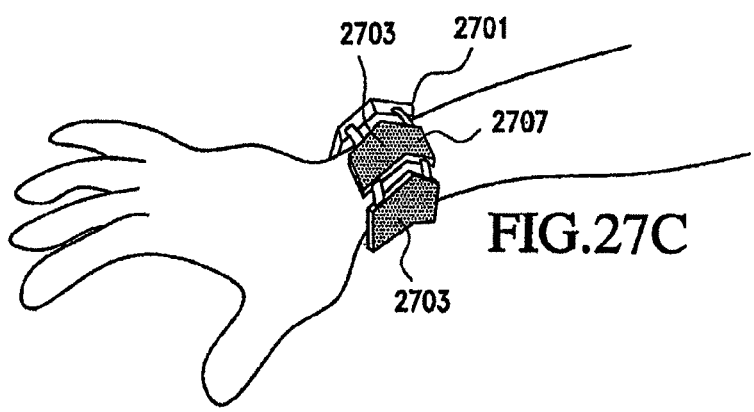
FIG. 27C is a third perspective view of the apparel depicted in FIG. 27A, the apparel being in a configuration to expose the tracking marks.

Apparel in the form of a band 2701 that bears graphic marks 2703 is depicted in FIGS. 27A-27C. Band 2701 includes a first surface 2705 and an opposite second surface 2707. First surface 2705 has properties that will not generally be tracked by an interactive activity device. Second surface 2707 includes graphic marks 2703 and is formed to have a contrast, color, shape, or reflectivity, for example, that is generally trackable by an interactive activity device. Accordingly, the individual may wear band 2701 in the concealed configuration by placing band 2701 upon the body such that first surface 2705 faces outward and second surface 2707 contacts the body, as depicted in FIG. 27A. In order to convert band 2701 to the exposed configuration, the individual merely flips band 2701 over, as depicted in FIGS. 27B and 27C, thereby exposing second surface 2707.

Figure 28A:
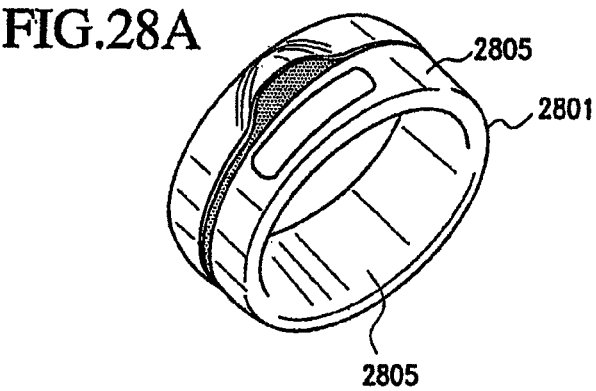
FIG. 28A is a first perspective view of apparel, particularly a band bearing tracking marks according to yet another embodiment of the invention, the apparel being in a configuration to conceal the tracking marks.
Figure 28B:
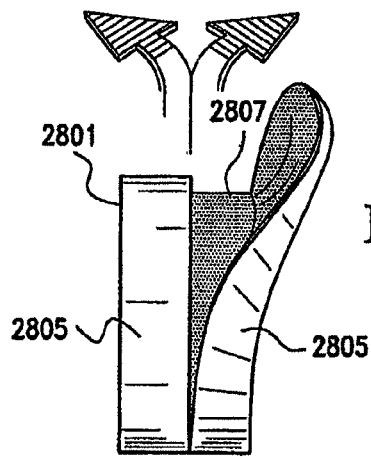
FIG. 28B is a side elevational view of the apparel depicted in FIG. 28A.
Figure 28C:
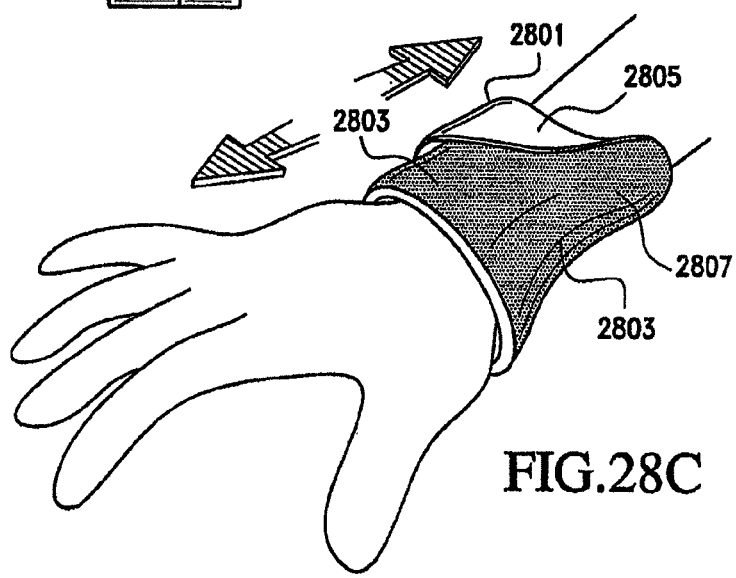
FIG. 28C is a second perspective view of the apparel depicted in FIG. 28A, the apparel being in a configuration to expose the tracking marks.

Another apparel embodiment in the form of a band 2801 that bears graphic marks 2803 is depicted in FIGS. 28A-28C. Band 2801 has a first surface 2805 and an opposite second surface 2807. The structure of band 2801 may be folded such that only first surface 2805 faces outward, or band 2801 may be unfolded such that second surface 2807 is exposed. First surface 2805 has properties that are not generally tracked by an interactive activity device, and second surface 2807 includes graphic marks 2803. The individual may wear band 2801 in the concealed configuration by folding band 2801 in the manner depicted in FIG. 28A. In order to convert band 2801 to the exposed configuration, the individual merely unfolds band 2801, as depicted in FIGS. 28B and 28C, thereby exposing second surface 2807.

Figure 29A:
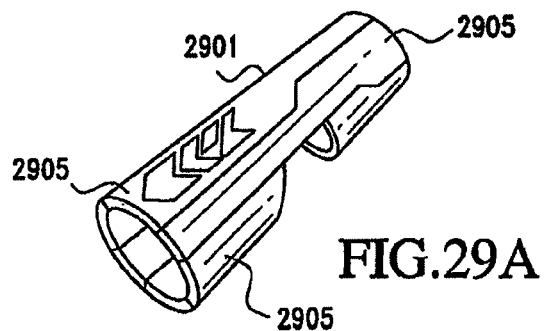
FIG. 29A is a perspective view of apparel, particularly a band bearing tracking marks according to another embodiment of the invention, the apparel being in a configuration to conceal the tracking marks.
Figure 29B:
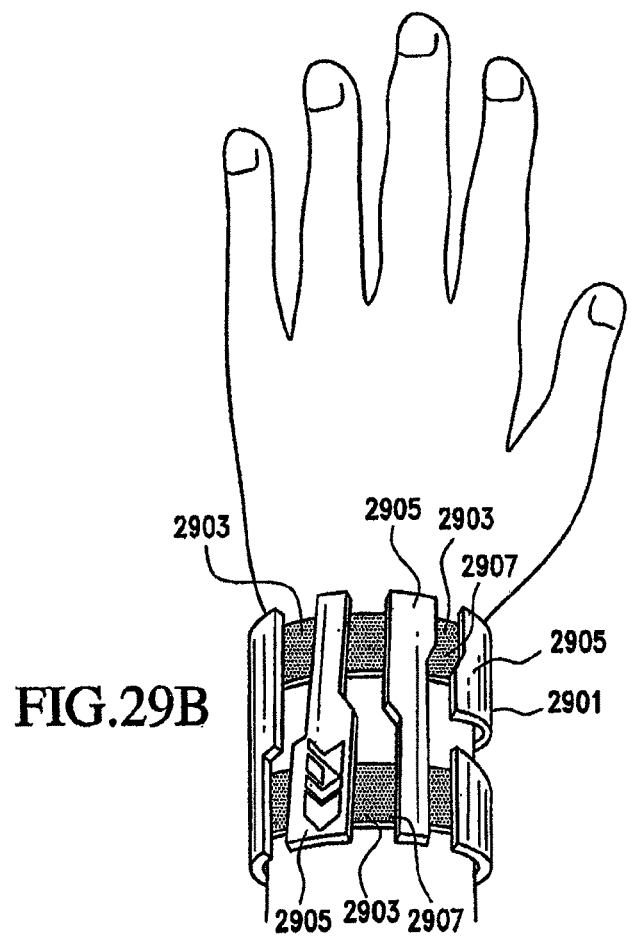
FIG. 29B is a top plan view of the apparel depicted in FIG. 29A, the apparel being in a configuration to expose the tracking marks.

With reference to FIGS. 29A and 29B, apparel that includes a band 2901 and graphic marks 2903 is disclosed. Band 2901 includes a plurality of segments 2905 that are connected by an elastic material 2907, with graphic marks 2903 being positioned on elastic material 2907. Segments 2905 cooperate to form a ring with dimensions that extend securely around a finger. By applying outward pressure to band 2901, however, elastic material 2907 stretches and band 2901 may be placed around the wrist, for example. Band 2901 may be worn in the concealed configuration upon a finger such that graphic marks 2903 are not exposed, as depicted in FIG. 29A. In order to convert band 2901 from the concealed configuration to the exposed configuration, however, elastic material 2907 is stretched and band 2901 placed around another portion of the body, thereby exposing graphic marks 2903, as depicted in FIG. 29B.

Figure 30A:
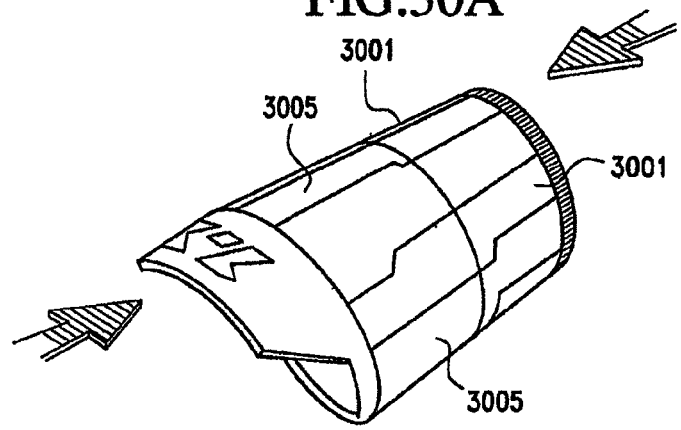
FIG. 30A is a perspective view of apparel, particularly a band bearing tracking marks according to another embodiment of the invention, the apparel being in a configuration to conceal the tracking marks.
Figure 30B:
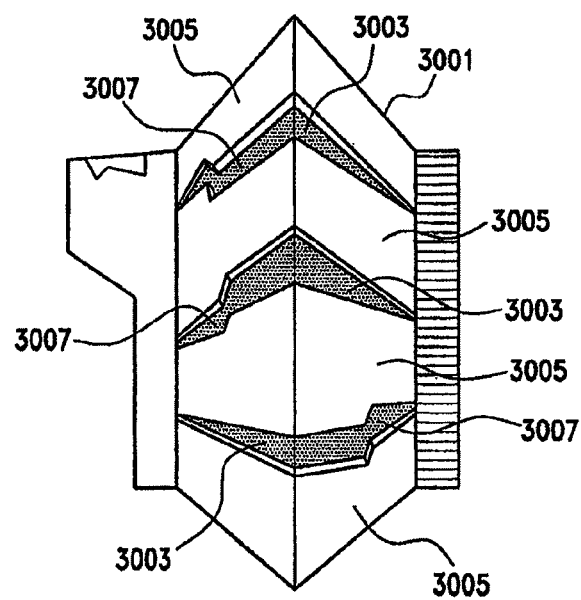
FIG. 30B is a side elevational view of the apparel depicted in FIG. 30A, the apparel being in a configuration to expose the tracking marks.

Apparel that includes a band 3001 and graphic marks 3003 is disclosed in FIGS. 30A and 30B. Band 3001 includes a plurality of segments 3005 that are connected by an elastic material 3007, with graphic marks 3003 being positioned on elastic material 3007. Segments 3005 have a structure that bends or flexes in a central area. By applying inward pressure to band 3001, segments 3005 will separate and protrude radially outward. Band 3001 may be worn in the concealed configuration, as depicted in FIG. 30A. In order to convert band 3001 from the concealed configuration to the exposed configuration, however, segments 3005 are flexed and elastic material 3007 is exposed between the various segments 3005, as depicted in FIG. 30B.

Apparel that includes a band 3101 and graphic marks 3103 is disclosed in FIGS. 31A-31C. Band 3101 includes a plurality of segments 3105 that are connected by an inflatable structure 3107, with graphic marks 3103 being positioned on inflatable structure 3107. By increasing the fluid pressure within inflatable structure 3107, band 3101 will increase in size and segments 3105 will separate to expose graphic marks 3103. Band 3101 may be worn in the concealed configuration, as depicted in FIG. 31A. In order to convert band 3101 from the concealed configuration to the exposed configuration, however, one of segments 3105 is lifted to expose an inlet 3109 for inflatable structure 3107, as depicted in FIG. 31B. The individual then blows upon inlet 3109 to inflate band 3101, expose graphic marks 3103, and place band 3101 in the exposed configuration, as depicted in FIG. 31C.

Figure 32A:
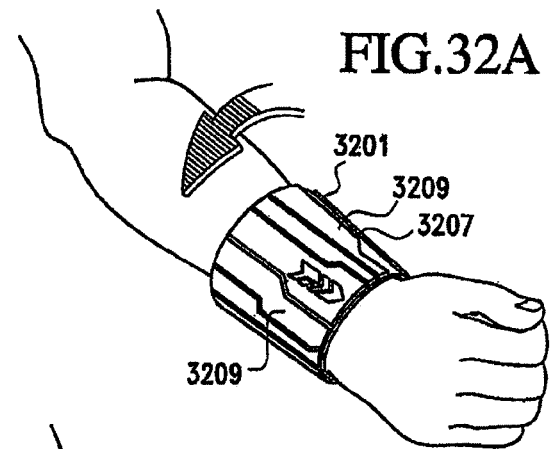
FIG. 32A is a first perspective view of apparel, particularly a band bearing tracking marks according to yet another embodiment of the invention, the apparel being in a configuration to conceal the tracking marks.
Figure 32B:
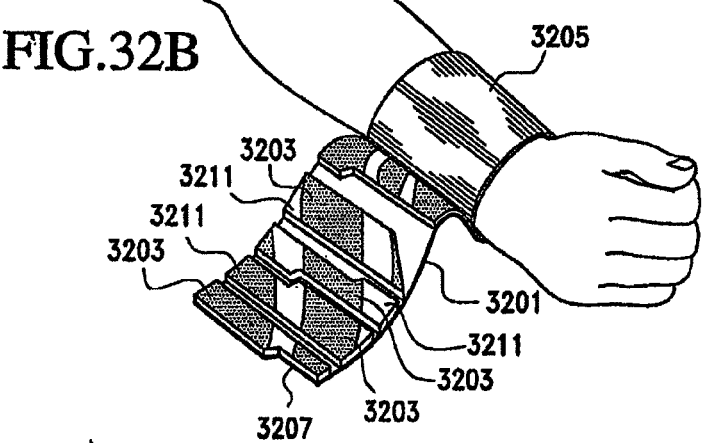
FIG. 32B is a second perspective view of the apparel depicted in FIG. 32A.
Figure 32C:
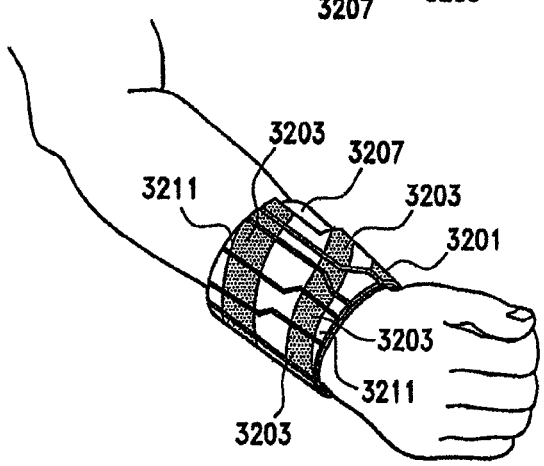
FIG. 32C is a third perspective view of the apparel depicted in FIG. 32A, the apparel being in a configuration to expose the tracking marks.

Referring to FIGS. 32A-32C apparel having a band 3201 and graphic marks 3203 is depicted. Band 3201 includes a cylindrical element 3205 that extends around a wrist, ankle, or other portion of the individual. Band 3201 also includes a flap 3207 that is detachable from element 3205. Flap 3207 includes a first surface 3209 and an opposite second surface 3211. First surface 3209 has properties that cannot generally be tracked by an interactive activity device. Second surface 3211 includes graphic marks 3203 and is formed to have a contrast, color, shape, or reflectivity, for example, that is generally trackable by an interactive activity device. Accordingly, the individual may wear band 3201 in the concealed configuration with first surface 3209 facing outward, as depicted in FIG. 32A. In order to convert band 3201 to the exposed configuration, the individual merely reverses the orientation of flap 3207 such that second surface 3211 faces outward, as depicted in FIGS. 32B and 32C, thereby placing band 3201 in the exposed configuration.

Another apparel embodiment in the form of a band 3301 that bears graphic marks 3303 is depicted in FIGS. 33A-33D. Band 3301 has a structure that is similar to band 2801 discussed above, except that a plurality of additional bands 3305 are positioned within band 3301. Additional bands 3305, which are depicted in FIG. 33B, bear graphic marks 3303 and may be tracked by interactive computer game 203. Band 3301 may be worn in the concealed configuration, as depicted in FIG. 33A, with additional bands 3305 located therein. In order to convert band 3301 to the exposed configuration, band 3301 is opened to reveal additional bands 3305, as depicted in FIG. 33C. Additional bands 3305 are then wrapped around various extremities, for example, to expose graphic marks 3303, as depicted in FIG. 33D.

Various apparel types may also be combined, as in FIGS. 34A-34C, which discloses a pair of pants 3401 that bears graphic marks 3403 and also discloses a pair of bands 3411 that bear graphic marks 3413. Pants 3401 include a pair of cuff areas 3405. Bands 3411 are configured to extend around cuff areas 3405 and conceal graphic marks 3403, which are located on cuff areas 3405. In the concealed configuration, therefore, bands 3411 extend around cuff areas 3405. In order to convert pants 3401 and bands 3411 to the exposed configuration, bands 3411 are detached from cuff areas 3405, thereby exposing graphic marks 3403. Detaching bands from cuff areas 3405 also exposes graphic marks 3413, which are located on the sides of bands 3411 that were in contact with cuff areas 3405. Bands 3411 may be placed on the wrists, for example, with graphic marks 3413 facing outward during use of an interactive activity device.

Apparel Serving as a Graphic Mark

Figure 35A:
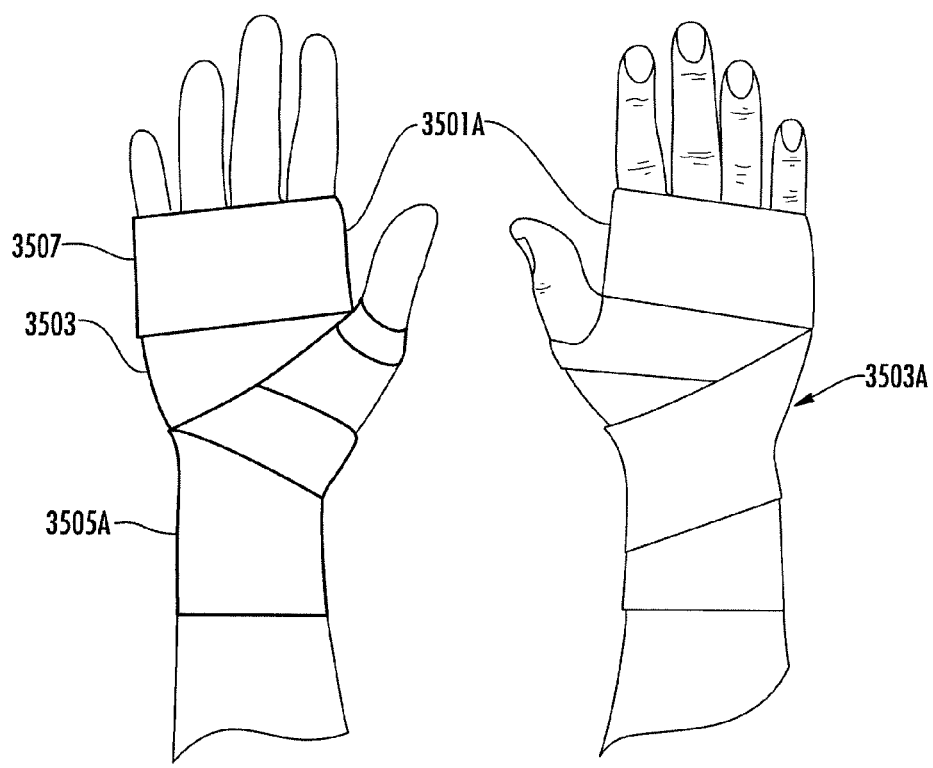
FIGS. 35A-35C illustrate a top elevational view of apparel, particularly hand and wrist bands according to still other embodiments of the invention, providing tracking marks.
Figure 35B:
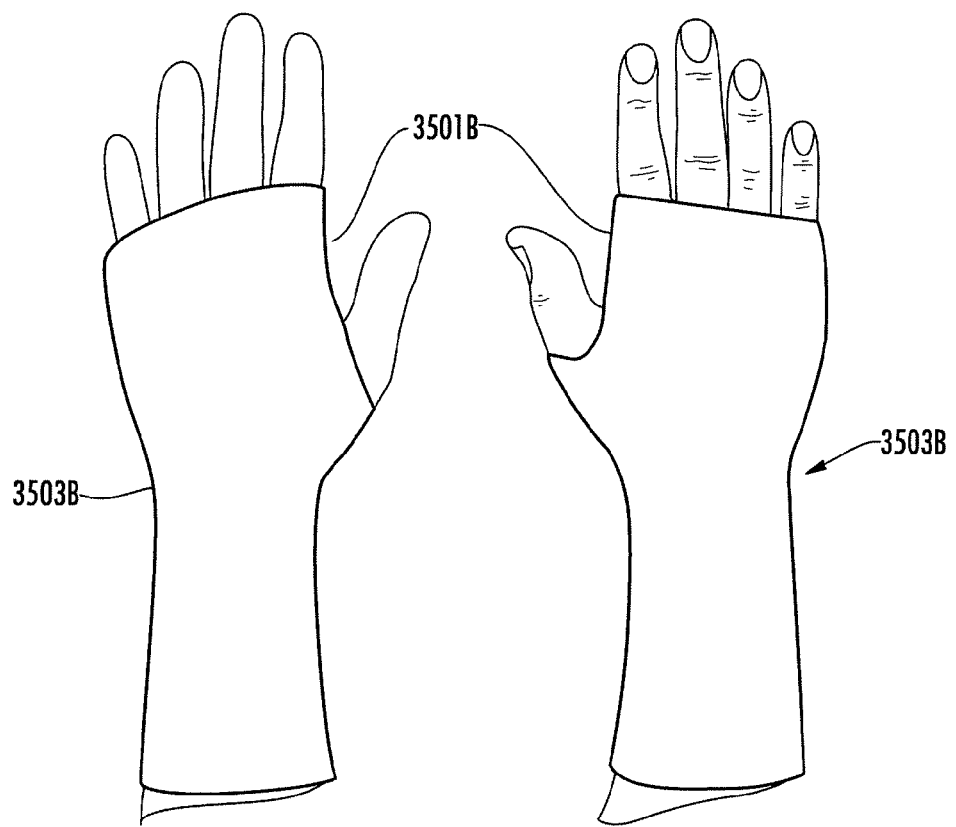
Figure 35C:
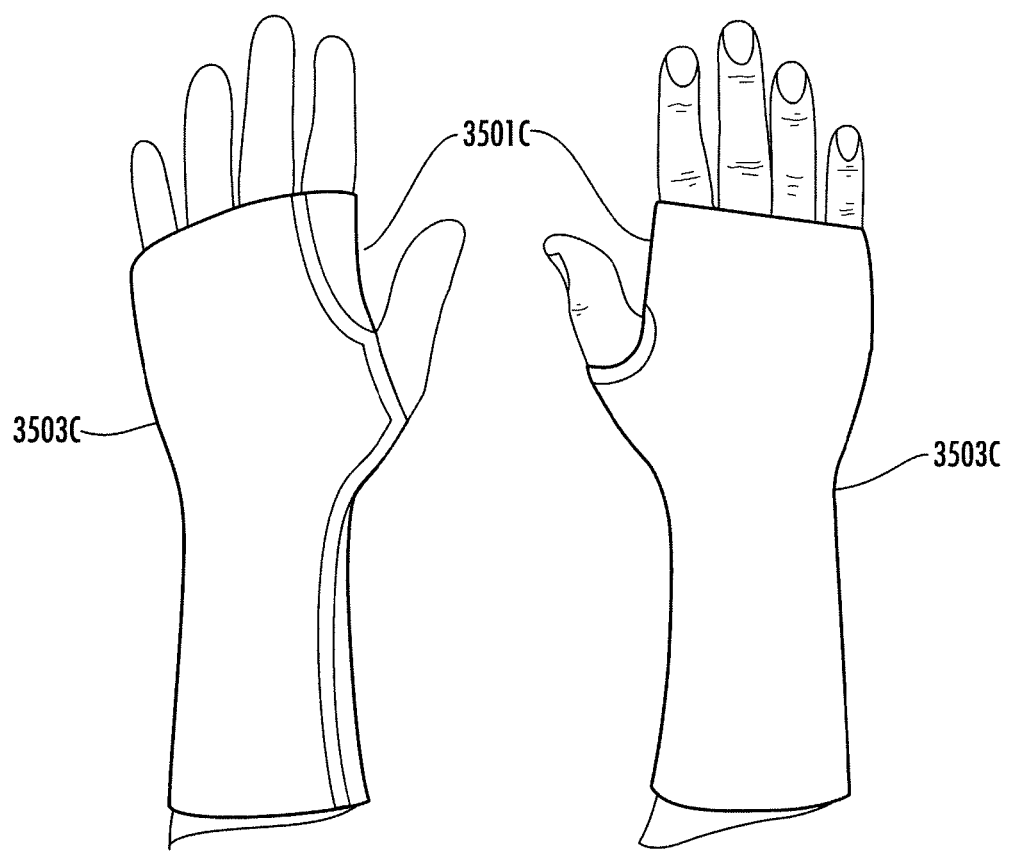

With some embodiments of the invention, an entire piece of apparel may service as a graphic mark. For example, FIGS. 35A-35C illustrate three examples of hand and wrist covers 3501 that may each serve as a graphic mark 3503. More particularly, the hand and wrist cover 3501A shown in FIG. 35A is formed of a wrap 3505 that is wrapped around a wearer's wrist, palm and thumb. One end of the wrap 3505 is then secured to the remainder of the wrap by a fastener 3507. The fastener 3507 may be any suitable fastener, such as a fastener employing a hook-and-loop material, a snap, an adhesive material or the like. FIG. 35B then illustrates a hand and wrist cover 3501B that is formed from a woven material such as, e.g., a knit material. As will be appreciated by those of ordinary skill in the art, such a knit material may be stretchable, so as to securely fit a range of hand sizes. The hand and wrist cover 3501C shown in FIG. 35C may then formed from a material employing a stretchable fiber such as elastane (e.g., LYCRA) or a non-woven material, such as, e.g., neoprene.

With each of the embodiments illustrated in FIGS. 35A-35C, the hand and wrist cover 3501 has a color that can be easily distinguished from most background environments. The covers 3501 may have, for example, a bright orange or bright yellow coloring. An interactive activity device can then use this distinctive coloring to discriminate the covers 3501 from a background environment, thereby allowing the interactive activity device to track movement of the covers 3501 and thus movement of a wearer's hand and wrist. Thus, the cover 3501 itself forms a tracking mark 3503 that can be tracked by an interactive activity device. Of course, it should be appreciated that any type of apparel may use a distinctive coloring, over a part or the entirety of the apparel, to form a graphic mark, and that this feature is not limited to hand and wrist covers.

Further, with various embodiments of then invention, reversible apparel may have a first distinguishable color on one side of the apparel and another, different distinguishable color on the opposite of the apparel. With these embodiments, a wearer may change the graphic mark simply by wearing the apparel in reverse. For example, each cover 3501 may have a different color on the surface opposite the shown surface. This different color may also be distinguished from most background environments (and thus tracked) by an interactive activity device. Accordingly, with various embodiments of the invention, a piece of apparel may itself serve as a graphic mark. Further, with some embodiments of the invention, a piece of apparel may server as two different graphic marks.

Types of Graphic marks

Overview

As will be discussed in detail below, a wide variety of materials and mechanisms may be employed to form graphic marks for use with an interactive activity device, a recognition device, or both. Some graphic marks may be passive, which are fixed. Still other graphic marks may be active. With this type of graphic mark, the features of the graphic mark may be change. With some embodiments of the invention, the features of an active graphic mark may be specified by the wearer. With other embodiments of the invention, the features of an active graphic mark may automatically change in response to an environment change, some activity by the wearer, or other outside stimulus.

Also, in many of the above-described examples of the invention, the graphic marks are formed of substantially two-dimensional surfaces. It should be noted, however, that various embodiments of the invention may employ three-dimensional graphic marks. For example, raised shapes, such as pyramidal or hemispherical shapes can be used as graphic marks for various embodiments of the invention. Advantageously, three-dimensional graphic marks may allow the marks to be visible to the interactive activity device from a variety of angles and directions.

Method of Manufacturing Apparel with a Graphic Mark

Figure 36:
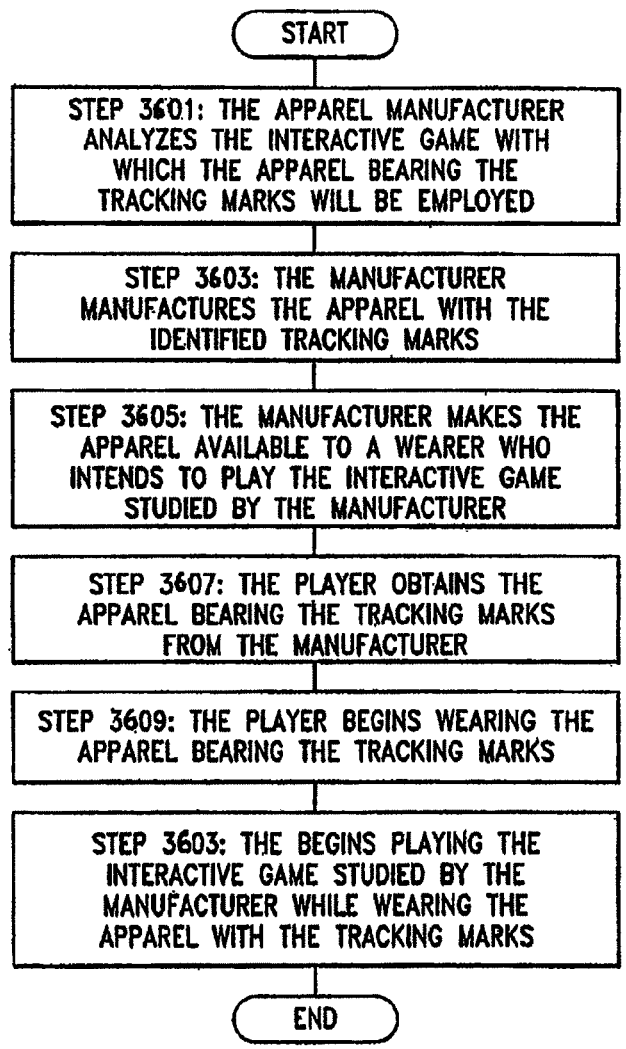
FIG. 36 illustrates a flowchart describing a method of manufacturing a piece of apparel with a graphic mark according to various embodiments of the invention.

One method of manufacturing apparel bearing a graphic mark, such as the shirt 101, according to various embodiments of the invention is illustrated in FIG. 36. In the illustrated embodiment, the method is for manufacturing apparel for use with a game 203, but it should be appreciated that this method can be adopted to manufacture apparel for any type of interactive activity device or recognition device. As seen in this figure, in step 3601, the apparel manufacturer analyzes the interactive game 203 with which the apparel bearing the graphic marks will be employed. More particularly, the apparel manufacturer determines the type of graphic mark or marks that the apparel should have in order to allow the interactive game 203 to properly track the user's movements. This information regarding the types of suitable graphic marks may be obtained directly from the manufacture of the interactive game 203, or it may be obtained by studying the components of the interactive game 203, such as the software code of the interactive game 203 (for example, the software code of the graphic mark identification module 211 or recognition module).

For example, as illustrated in FIG. 1, the shirt 101 bears specific shapes (that is, cross shapes) that the interactive game 203 can easily identify as graphic marks. With alternate embodiments of the invention, however, the interactive game may distinguish graphic marks of specific colors rather than specific shapes. For example, with some embodiments of the invention, the interactive game may more easily identify a graphic mark having the color red from a blue background of the apparel than a graphic mark having a particular shape. Alternately, or additionally, some interactive games may better distinguish reflective graphic marks than graphic marks that simply have a high contrast with respect to the apparel on which they are placed. For example, with some embodiments of the invention, the interactive game may employ an electromagnetic wave transmitter, such as an infrared, visible light or sonic transmitter, together with one or more detectors for detecting the reflection of these electromagnetic waves. The graphic marks can then be formed of a material that is particularly reflective of the appropriate type of electromagnetic wave.

Further, some interactive games may track only the player's position. With these games, the piece of apparel might require only a single graphic mark located in a central position on the apparel. Moreover, the interactive game may actually track the movement of each of the player's extremities. With this type of interactive game, the apparel might require multiple graphic marks, such as one on each sleeve of a shirt, or on each leg of a pair of pants.

After the manufacturer has determined the appropriate graphic mark or marks to be applied to the apparel, the manufacture manufactures the apparel with those graphic marks in step 3603. As discussed in detail above, the manufacturer can manufacture the apparel to inherently include the graphic marks, or the manufacturer may apply the graphic marks to the apparel after the apparel is created. Next, in step 3605, the manufacturer makes the apparel available to a wearer who intends to play the interactive game studied by the manufacturer. Then, in step 3607, the player 201 obtains the apparel bearing the graphic marks from the manufacturer. In step 3609, the player 201 begins wearing the apparel bearing the graphic marks, and, in step 3611, begins playing the interactive game studied by the manufacturer while wearing the apparel with the graphic marks.

As discussed above, the apparel employing the graphic marks may be of any desired type. For example, with some embodiments of the invention, the apparel can include shirts, such as long sleeve shirts and sleeve shirts, jackets, pants, shorts, socks, and hat. The apparel can also include footwear. Still further, the apparel may be a hand-held object, such as a weight or piece of sports equipment, a band, such as a band that may be worn around the player's wrist, chest or ankles, or a sticker that may be applied to apparel that the player already possesses. In addition to the method described above, with still other embodiments of the invention a user may personally select the graphic mark or marks that will be displayed on a piece of apparel. For example, a manufacturer may provide one or more components, such as laminates or adhesive materials, which will allow a wearer to form an individualized graphic mark on apparel.

Retroreflective Graphic marks

Figure 37:
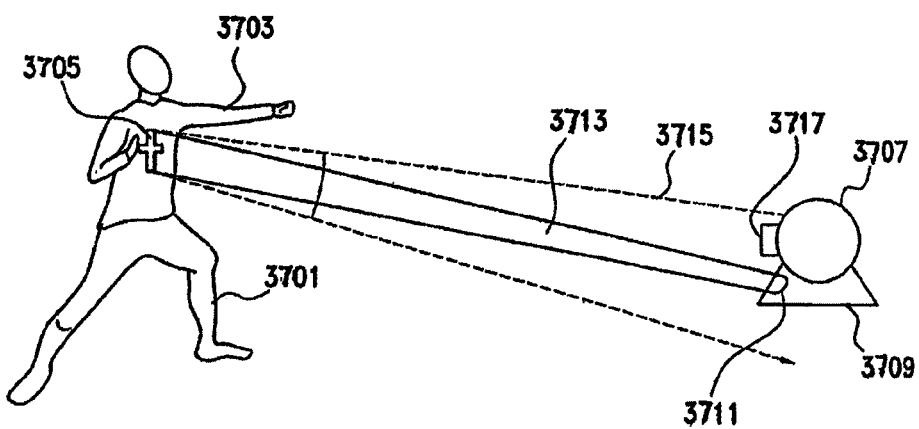
FIG. 37 illustrates the use of a camera with an interactive device according to various embodiments of the invention.

FIG. 37 illustrates yet another embodiment of the invention that employs one or more retroreflective graphic marks to assist an interactive game in tracking the movements of a player. As seen in this figure, the player 3701 is wearing a shirt 3703 that bears a chest graphic mark 3705. The graphic mark 3705 is formed of retroreflective material. As is known in the art, retroreflective material is a material that reflects light back in the direction of its source.

Figure 38:
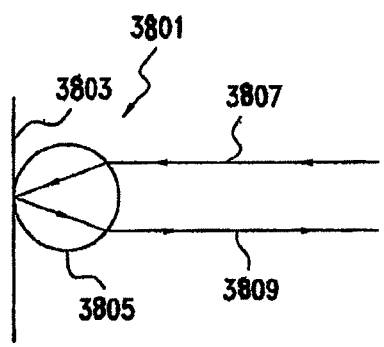
FIG. 38 illustrates a graphic representation of the operation of retroreflectivity.

More particularly, the operation of retroreflectivity will be discussed briefly with reference to FIG. 38. As will be appreciated by those of ordinary skill in the art, materials typically will reflect in one of two ways. First, a surface may diffusely reflect incident light. That is, if incident light strikes a diffusive surface at a particular angle, the surface will reflect that incident light in multiple directions, and not produce a clear reflection of the incident light. Second a surface may provide a specular or mirror reflection. With this type of surface, if incident light strikes the surface at a particular angle, the surface will reflect the incident light at the opposite angle. With retroreflective surfaces, however, the incident light is reflected in generally the same direction from which it originated.

As known in the art, a retroreflective surface 3801 includes a mirrored layer 3803 and a retroreflective sheeting layer over the mirrored player 3803. The retroreflective sheeting layer may be formed of tiny cube or prism elements, or it may be formed of transparent beads, such as the sphere 3805 shown in FIG. 38. As seen in this figure, when an incident light ray 3807 strikes the bead 3805, it is reflected toward the center axis (perpendicular to the mirrored layer 3803) of the bead 3805. When the incident light ray 3807 is then reflected from the mirrored surface 3803, it exits the bead 3805 in a direction generally parallel to that of the incident light ray 3807. Thus, retroreflective surfaces will reflect incident light in generally the same direction from which it originated. Of course, there will be some deviation between the direction of the incident light ray and its corresponding reflected light ray. This deviation is referred to as the observation angle.

Returning now to FIG. 37, the interactive game being used by the player 3701 employs a camera 3707 to take advantage of the retroreflectivity of the graphic mark 3705. The camera 3707 includes a stand 3709 having a light source 3711 mounted thereon. When a beam of incident light 3713 is directed from the light source 3711, the graphic mark 3705 reflects the incident light 3713 in a beam of reflected light 3715. The direction of the reflected light beam 3715 is back toward the light source 3711. Because the camera lens 3717 is relatively close to the light source 3711, it is within the observation angle for light reflected from the light source 3711.

Thus, the camera lens 3717 will image the light from the light source 3711 reflected by the retroreflective graphic mark 3705. As will be appreciated by those of ordinary skill in the art, however, other observers standing outside of the observation angle will not view the reflected light 3715 from the retroreflective graphic mark 3705. Instead, to these observers, the graphic mark 3705 will simply appear as a somewhat shiny mark. Moreover, because of the high reflectivity of the retroreflective graphic mark 3705, the image of the graphic mark 3705 will be strongly distinguished from its surrounding background, such as the background provided by the shirt 3703. This will assist the interactive computer game in recognizing the graphic mark 3705 from its background.

Of course, it will be appreciated that the light source 3711 need not be mounted on the stand 3709 of the camera 3707 in order for the camera 3707 to be within the observation angle for light reflected from the light source 3711. Instead, as will be apparent to those of ordinary skill in the art, the area encompassed by the observation angle for light reflected from the retroreflective graphic mark 3705 will depend upon the distance from the light source 3711 to the graphic mark 3705. Whether or not the camera 3707 will be within the area encompassed by the observation angle will also depend upon the distance of the camera 3707 to the retroreflective graphic mark 3705.

Figure 39:
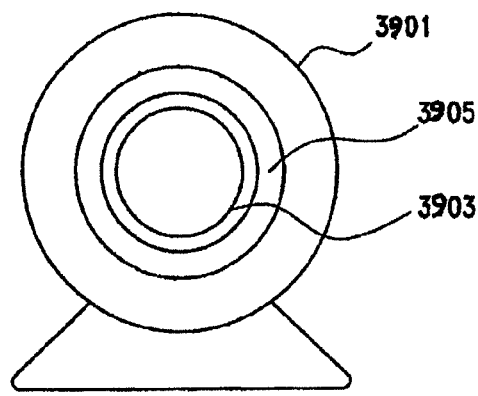
FIG. 39 illustrates a camera for use with the invention according to still other embodiments of the invention.

FIG. 39 illustrates one embodiment of a camera 3901 that typically ensures that the images obtained by the camera 3901 will include light from within the observation angle of light reflected from a retroreflective graphic mark. The camera 3901 includes a camera lens 3903 and a light source 3905. As seen in FIG. 39, the light source 3905 encircles the lens 3903. Thus, any light from the light source 3905 will be retroreflected back to the camera lens 3903. That is, in almost all situations, the camera lens 3903 will be within the observation angle of light reflected from the light source 3905. Of course, as will be appreciated by those of ordinary skill in the art, the radial distance between the lens 3903 and the light source 3905 can be modified based upon the expected distance to the retroreflective graphic mark. In most situations, the interactive computer game will typically specify a depth of a playing area. Thus, the intended depth of the playing area can be taken into account when spacing the light source 3905 from the lens 3903.

It should be noted that, in addition to the light source/lens configurations shown in FIGS. 37 and 39, a variety of other configurations are also possible. For example, the light source 3905 may only partially encircle the camera lens 3903. Alternately, the light source 3905 may be mounted with a different support than the mount for the camera. A wide variety of positioning and mounting options are separately available for the light source 3905 and the camera lens 3903 that will still maintain the camera lens 3903 within the observation angle for light reflected by a retroreflective target from the light source 3905.

Active Graphic Marks

As previously noted, the features of a graphic mark according to various embodiments of the invention may be controlled by a wearer, may automatically respond to other outside stimulus, or both. For example, with some embodiments of the invention, a graphic mark may be formed of a flexible display, such as a flexible display formed of organic materials or a flexible display employing an array of magnetized, bi-colored spheres. With this arrangement, the wearer (or other person) may use a controller, such as a keypad, digitizer or remote computing device to change the appearance of the graphic mark as desired. With still other embodiments of the invention, the graphic mark may be formed of some material that automatically changes features in response to an outside stimulus, such as an environmental condition or use of the apparel. For example, the graphic mark may be formed of a material that changes color depending upon its temperature. As another example, the graphic mark may be formed from a light provided on a shoe that changes color after a preset number of footsteps.

Formation of Graphic Marks

As discussed above, graphic marks according to various embodiments of the invention may be formed using any desired technique or method. For example, graphic marks may be stitched to apparel, adhered to apparel using any suitable adhesive, or woven or knitted into the material of the apparel. Further, the graphic marks can be printed onto apparel using a pad printing technique. The graphic marks also can be heat transferred onto apparel, die-sublimated onto apparel, or simply died into the material of the apparel. In addition, the graphic marks can be glued onto apparel, impregnated into apparel using, for example, thermoforming, or etched into the material of the apparel. Still further, graphic marks can be permanently mechanically attached to apparel using any suitable fastening mechanism, such as pins or staples. It should also be appreciated that, where desired, multiple graphic marks can be applied to a single piece of apparel using a different technique.

It also should be appreciated that, while both the term graphic mark and graphic marks are used separately herein for convenience, various embodiments of the invention may treat multiple markings as a single graphic mark. Similarly, a single mark may include any appropriate feature described above with respect to plural graphic marks.

Conclusion

From the foregoing description, it will be appreciated that there are any number of alternative embodiments of the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It is intended that the written description of the invention contained herein covers all such modifications and alterations.

What is claimed is:

1. A system configured to recognize tracking marks, comprising:
   an interactive activity device comprising:
      a processor;
      a computer operated recognition device including a camera; and
      a non-transitory computer-readable medium comprising computer-executable instructions that when executed by the processor, cause the processor to at least:
         capture images of a tracking mark on an article of wear worn by a user during movement by the user within a field of view of the camera, and wherein the movement by the user induces movement of the tracking mark, wherein the tracking mark is configured to alternate between a first appearance state and a second appearance state, where while in the first appearance state the tracking mark primarily displays a first color and while in the second appearance state the tracking mark primarily displays a second color;
         recognize with the processor, the tracking mark displayed on the article of wear from the images provided by the camera;
         recognize with the processor whether the tracking mark is in the first appearance state or the second appearance state; and
         perform a first computer function based on a recognition of the first appearance state of the tracking mark or a second computer function based on a recognition of the second appearance state of the tracking mark.

2. The system of recognizing tracking marks recited in claim 1, wherein the first computer function is selected from the group consisting of: turning off the interactive activity device, changing a type or characteristic of the interactive activity device, and allowing input of alphanumeric information into the interactive activity device.

3. The system of recognizing tracking marks recited in claim 1, wherein the tracking mark is configured to alternate between a first appearance state and a second appearance state based on an input from the user.

4. The system of recognizing tracking marks recited in claim 1, wherein the tracking mark is configured to alternate between a first appearance state and a second appearance state based on environmental temperature.

5. The system of recognizing tracking marks recited in claim 1, wherein the tracking mark is configured to alternate between a first appearance state and a second appearance state based on a use of the article of wear.

6. The system of recognizing tracking marks recited in claim 5, wherein the use of the article of wear is a preset number of footsteps.

7. The system of recognizing tracking marks recited in claim 1, wherein the tracking mark is incorporated into a structure of the article of wear by a technique selected from the group consisting of: silk screening, pad printing, heat transfer, dye sublimation, dyeing, stitching, adhering with an adhesive, impregnation, etching, stapling riveting, and combinations thereof.

8. The system of recognizing tracking marks recited in claim 1, wherein the article of wear is selected from the group consisting of: footwear, a shirt, pants, a jacket, shorts, a sock, a hat, a band, and combinations thereof.

9. The system of recognizing tracking marks recited in claim 1, wherein while in the first appearance state the tracking mark has a color that can be recognized by a tracking recognition module in operative communication with the processor.

10. The system of recognizing tracking marks recited in claim 1, wherein while in the first appearance state the tracking mark has a shape that can be recognized by a tracking recognition module.

11. The system of recognizing tracking marks recited in claim 1, wherein the tracking mark has a reflectivity that can be recognized by a tracking recognition module while in the first appearance state but not in the second appearance state.

12. The system of recognizing tracking marks recited in claim 1, wherein the interactive activity device is configured to provide an interactive activity that includes a computer game.

13. The system of recognizing tracking marks recited in claim 12 wherein the performing of a second computer function includes opening a new game based on the recognition of the second appearance state of the tracking mark.

14. The system of recognizing tracking marks recited in claim 12, wherein the computer game allows the user to access game play with a second user over a network.

15. A method of recognizing tracking marks with an interactive activity device, comprising:
providing a computer operated recognition device including a camera for imaging a tracking mark displayed on an article of wear, wherein the tracking mark is configured to alternate between a first appearance state and a second appearance state, where while in the first appearance state the tracking mark primarily displays a first color and while in the second appearance state the tracking mark primarily displays a second color;
providing a tracking mark recognition module for receiving images from the camera and identifying the tracking mark in the images;
capturing user activity using the camera, wherein the user activity includes capturing user movement while wearing the article of wear within a field of view of the camera, and wherein the user movement induces movement of the tracking mark;
recognizing the tracking mark displayed on the article of wear from the images provided by the camera, using the tracking mark recognition module;
determining whether the tracking mark is in the first appearance state or the second appearance state; and
performing a first computer function based on a recognition of the first appearance state of the tracking mark or a second computer function based on a recognition of the second appearance state of the tracking mark.

16. The method of recognizing tracking marks recited in claim 15, wherein the first computer function is selected from the group consisting of: turning off the interactive activity device, changing a type or characteristic of the interactive activity device, and allowing input of alphanumeric information into the interactive activity device.

17. The method of recognizing tracking marks recited in claim 15, wherein the tracking mark is configured to alternate between a first appearance state and a second appearance state based on an input from a user.

18. The method of recognizing tracking marks recited in claim 15, wherein the tracking mark is configured to alternate between a first appearance state and a second appearance state based on environmental temperature.

19. The method of recognizing tracking marks recited in claim 15, wherein the tracking mark is configured to alternate between a first appearance state and a second appearance state based on a use of the article of wear.

20. The method of recognizing tracking marks recited in claim 19, wherein the use of the article of wear is a preset number of footsteps.

* * * * *